US012422760B2

(12) United States Patent
Watariguchi et al.

(10) Patent No.: US 12,422,760 B2
(45) Date of Patent: Sep. 23, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Kaname Watariguchi, Kanagawa (JP); Kohei Makisumi, Shizuoka (JP); Kenichi Kaku, Shizuoka (JP); Haruyuki Tsuji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 598 days.

(21) Appl. No.: 17/814,048

(22) Filed: Jul. 21, 2022

(65) Prior Publication Data

US 2023/0059696 A1 Feb. 23, 2023

(30) Foreign Application Priority Data

Aug. 6, 2021 (JP) ................................ 2021-130207

(51) Int. Cl.
*G03G 5/047* (2006.01)
*G03G 21/18* (2006.01)

(52) U.S. Cl.
CPC ......... *G03G 5/047* (2013.01); *G03G 21/1814* (2013.01)

(58) Field of Classification Search
CPC ........................... G03G 5/047; G03G 21/1814
See application file for complete search history.

(56) References Cited

U.S. PATENT DOCUMENTS

| | | | |
|---|---|---|---|
| 5,357,320 | A | 10/1994 | Kashimura |
| 5,385,797 | A | 1/1995 | Nagahara |
| 5,422,210 | A | 6/1995 | Maruyama |
| 5,455,135 | A | 10/1995 | Maruyama |
| 5,485,250 | A | 1/1996 | Kashimura |
| 7,585,604 | B2 | 9/2009 | Ogaki |

(Continued)

FOREIGN PATENT DOCUMENTS

| | | | |
|---|---|---|---|
| JP | 2000-137340 | A | 5/2000 |
| JP | 2001-183852 | A | 7/2001 |

(Continued)

OTHER PUBLICATIONS

Minoru Umeda, "Extrinsic Photocarrier Generation Process and Kinetics of a Layered Organic Photoreceptor", J. Chem. Soc. Jap., No. 11 (1996) 932-37.

(Continued)

*Primary Examiner* — Mark F. Huff
*Assistant Examiner* — Boone Alexander Evans
(74) *Attorney, Agent, or Firm* — VENABLE LLP

(57) ABSTRACT

Provided is an electrophotographic photosensitive member that includes a support, a charge generation layer on the support, and a charge transfer layer on the charge generation layer and that satisfies specifications on an EV curve based on a measurement method of NESA-EV curve. The electrophotographic photosensitive member can exhibit high character quality and a digital gradation characteristic in a low-line-number halftone while maintaining an analog gradation characteristic in a high-speed process.

18 Claims, 5 Drawing Sheets

(56) References Cited

U.S. PATENT DOCUMENTS

| | | | |
|---|---|---|---|
| 7,910,274 | B2 | 3/2011 | Tanaka |
| 7,927,774 | B2 | 4/2011 | Ogaki |
| 8,455,170 | B2 | 6/2013 | Nakamura |
| 8,778,580 | B2 | 7/2014 | Tsuji |
| 8,783,209 | B2 | 7/2014 | Kaku |
| 8,841,052 | B2 | 9/2014 | Watariguchi |
| 8,974,991 | B2 | 3/2015 | Kawahara |
| 8,980,510 | B2 | 3/2015 | Fujii |
| 9,029,054 | B2 | 5/2015 | Okuda |
| 9,046,797 | B2 | 6/2015 | Fujii |
| 9,063,505 | B2 | 6/2015 | Sekiya |
| 9,068,083 | B2 | 6/2015 | Tanaka |
| 9,069,267 | B2 | 6/2015 | Kaku |
| 9,256,145 | B2 | 2/2016 | Fujii |
| 9,372,417 | B2 | 6/2016 | Fujii |
| 9,372,418 | B2 | 6/2016 | Shida |
| 9,372,419 | B2 | 6/2016 | Tsuji |
| 9,436,106 | B2 | 9/2016 | Kuno |
| 9,459,542 | B2 | 10/2016 | Tanaka |
| 9,500,966 | B2 | 11/2016 | Watariguchi |
| 9,535,347 | B2 | 1/2017 | Watariguchi |
| 9,563,139 | B2 | 2/2017 | Kawahara |
| 9,599,915 | B2 | 3/2017 | Anezaki |
| 9,645,515 | B2 | 5/2017 | Kuno |
| 9,645,516 | B2 | 5/2017 | Kawahara |
| 9,869,032 | B2 | 1/2018 | Kawahara |
| 10,073,362 | B2 | 9/2018 | Fujii |
| 10,162,278 | B2 | 12/2018 | Kuno |
| 10,203,617 | B2 | 2/2019 | Kuno |
| 10,303,085 | B2 | 5/2019 | Sato |
| 10,539,892 | B2 | 1/2020 | Nishida |
| 10,558,132 | B2 | 2/2020 | Ishiduka |
| 10,558,133 | B2 | 2/2020 | Nakamura |
| 10,831,117 | B2 | 11/2020 | Sakakibara |
| 10,831,118 | B2 | 11/2020 | Watanabe |
| 10,942,462 | B2 | 3/2021 | Ito |
| 11,112,719 | B2 | 9/2021 | Makisumi |
| 11,126,097 | B2 | 9/2021 | Ishida |
| 11,137,716 | B2 | 10/2021 | Hiyama |
| 11,150,566 | B2 | 10/2021 | Iwasaki |
| 11,181,837 | B2 | 11/2021 | Sekiya |
| 11,237,493 | B2 | 2/2022 | Makisumi |
| 11,249,407 | B2 | 2/2022 | Watariguchi |
| 11,256,186 | B2 | 2/2022 | Shimozawa |
| 11,340,553 | B2 | 5/2022 | Watariguchi |
| 11,366,402 | B2 | 6/2022 | Ishiduka |
| 11,392,050 | B2 | 7/2022 | Nishida |
| 2010/0232830 | A1 | 9/2010 | Wada |
| 2014/0004450 | A1 | 1/2014 | Tokimitsu |
| 2014/0141362 | A1 | 5/2014 | Watariguchi |
| 2015/0093693 | A1 | 4/2015 | Watariguchi |
| 2015/0346617 | A1 | 12/2015 | Kawahara |
| 2015/0362847 | A1 | 12/2015 | Tanaka |
| 2016/0131985 | A1 | 5/2016 | Tanaka et al. |
| 2018/0314171 | A1* | 11/2018 | Watariguchi ......... G03G 5/0525 |
| 2019/0243260 | A1* | 8/2019 | Ito .......................... G03G 5/144 |

FOREIGN PATENT DOCUMENTS

| | | | |
|---|---|---|---|
| JP | 2002-72522 | A | 3/2002 |
| JP | 2003-195577 | A | 7/2003 |
| JP | 2007-206349 | A | 8/2007 |
| JP | 2014-197237 | A | 10/2014 |
| JP | 2015-222416 | A | 12/2015 |
| JP | 2016-105159 | A | 6/2016 |
| JP | 2016-161713 | A | 9/2016 |
| JP | 2018-189692 | A | 11/2018 |
| WO | 2018/110091 | A | 6/2018 |

OTHER PUBLICATIONS

U.S. Appl. No. 17/812,227, Michiyo Sekiya, filed Jul. 13, 2022.
U.S. Appl. No. 17/814,603, Hideharu Shimozawa, filed Jul. 25, 2022.
U.S. Appl. No. 17/814,655, Tatsuya Yamaai, filed Jul. 25, 2022.
U.S. Appl. No. 17/815,276, Akihiro Maruyama, filed Jul. 27, 2022.
U.S. Appl. No. 17/816,024, Kenichi Kaku, filed Jul. 29, 2022.
U.S. Appl. No. 17/816,028, Kohei Makisumi, filed Jul. 29, 2022.
U.S. Appl. No. 17/936,088, Shuntaro Watanabe, filed Sep. 28, 2022.
U.S. Appl. No. 17/937,509, Nobuhiro Nakamura, filed Oct. 3, 2022.

* cited by examiner (a)LOW LIGHT AMOUNT

ANALOG GRADATION: FAIR (b)HIGH LIGHT AMOUNT

ANALOG GRADATION: NOT GOOD

1dot : 42μm × 42μm
@600dpi

ANALOG GRADATION CONTROL IS PERFORMED BY USING MACRO AVERAGE POTENTIAL

DIGITAL GRADATION CONTROL IS PERFORMED BY USING MICRO AREA RATIO

BOTH GRADATIONS ARE PRESENT IN ACTUAL SPOT DIAMETER IS

- SUFFICIENTLY LARGER THAN ONE DOT
  →ANALOG GRADATION
- SUFFICIENTLY SMALLER THAN ONE DOT
  →DIGITAL GRADATION

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member as well as a process cartridge and an electrophotographic apparatus using the electrophotographic photosensitive member.

Description of the Related Art

An electrophotographic process relating to an electrophotographic photosensitive member (hereinafter, also simply referred to as "photosensitive member") mainly includes four processes of charging, exposure, development, and transfer and processes of cleaning and pre-exposure are added as necessary. Among these, the exposure process is a process in which charge distribution of the photosensitive member is controlled and a surface of the photosensitive member is set to have desired potential distribution and is a process that is the heart of electrostatic latent image formation.

As a method of controlling an image concentration of an electrophotographic apparatus in the exposure process, there are two methods of an analog gradation method and a digital gradation method. The analog gradation method is a method of expressing a concentration gradation from a toner non-development portion (so called white solid) to a toner maximum development portion (so-called black solid). In the analog gradation method, an exposure amount is adjusted. An average potential of the photosensitive member surface is thereby a value with multiple levels and an amount of toner developed on the photosensitive member in the development process is controlled by the adjustment. Meanwhile, in the digital gradation method, the concentration gradation is expressed by controlling an area ratio of one black solid dot. Accordingly, in the digital gradation method, a one-dot region irradiated with light is always black solid and a toner development amount in the light irradiated portion is always set to the maximum by fixing the light amount in light emission to the maximum and setting the photosensitive member surface potential of the light irradiate portion to the minimum.

Since a semiconductor laser used in an electrophotographic apparatus of recent years has a small spot diameter, the digital gradation method is the mainstream. Meanwhile, the semiconductor laser generally has bell-shaped spot diameter-light amount distribution. Moreover, a $1/e^2$ diameter of the semiconductor laser is typically several tens of m to one hundred m and this is about the same as one-dot lengths of 84 μm, 42 μm, and 21 μm in images with resolutions of 300 dpi, 600 dpi, and 1,200 dpi, respectively, in a typical electrophotographic apparatus. Accordingly, even if the irradiation is performed at the maximum light amount, a portion irradiated with a low light amount outside the $1/e^2$ diameter is formed in one dot. Thus, both of the digital gradation and the analog gradation are actually mixed even when the digital gradation method is employed, and a ratio between the two gradations depends on the number of lines (line number) in image formation. The smaller the line number is, the lower the image frequency is and the relatively smaller the spot diameter is. Accordingly, the gradation becomes closer to the digital gradation. Meanwhile, the larger the line number is, the higher the image frequency is and the relatively larger the spot diameter is. Accordingly, the gradation becomes closer to the analog gradation.

The electrophotographic photosensitive member used in the electrophotographic apparatus is generally a member in which various layers such as a photosensitive layer are formed on a support. Moreover, in recent years, from viewpoints of low cost and high productivity, an organic photosensitive member in which a main component of layers formed on the support is a resin is popular as the electrophotographic photosensitive member. Among such organic photosensitive members, an organic photosensitive member in which the photosensitive layer is a layered photosensitive layer is the mainstream due to advantages of high sensitivity and versatility in material design. The layered organic photosensitive member is formed by stacking a charge generation layer containing a charge generation substance such as a photoconductive dye or a photoconductive pigment and a charge transfer layer containing a charge transfer substance such as a photoconductive macromolecule or a photoconductive small molecule one on top of the other.

The charge transfer layer of the layered organic photosensitive member has a resin as the main component. However, since the electrical resistance of the resin itself is generally high, the charge transfer layer tends to trap a charge generated by exposure. Moreover, the generated charge tends to be trapped at an interface between the charge transfer layer and the charge generation layer due to obstacles caused by a difference in energy potential between the two layers. Accordingly, the layered organic photosensitive member generally has such a problem that, even if the layered organic photosensitive member is irradiated with sufficiently strong light, a remaining surface potential (hereinafter, referred to as "residual potential") is high. This problem is confirmed in a graph (hereinafter, referred to as "EV curve") indicating a relationship between an exposure light irradiation amount $I_{exp}$ [μJ/cm$^2$] on the photosensitive member and an absolute value $V_{exp}$ [V] of the surface potential in the exposure. Moreover, the layered organic photosensitive member has such a problem that the linearity of the EV curve tends to become poor near an exposure amount $I_{1/2}$ [μJ/cm$^2$] in the case where the charging potential has decreased by half, also due to the aforementioned trap.

The concentration of the black solid one dot in the digital gradation becomes higher and more stable as the residual potential becomes lower and closer to 0 [V]. Meanwhile, the linearity of the relationship between the exposure light irradiation amount and the surface average potential becomes high, that is the relationship between the toner development amount and the exposure amount becomes closer to a linear shape and the analog gradation is improved as the linearity of the EV curve becomes higher.

Accordingly, it can be said that the aforementioned problems of the layered organic photosensitive member, that is high residual potential and poor linearity of the EV curve are factors that impair the digital gradation characteristic and the analog gradation characteristic, respectively.

Moreover, in recent years, a pigment disperse system charge generation layer is used to improve sensitivity of the organic photosensitive member. In the pigment disperse system charge generation layer, an interface between a resin and a pigment dispersed in the resin further traps the charge. Accordingly, the aforementioned problems of the layered organic photosensitive member are particularly significant. Thus, in the layered organic photosensitive member, it is difficult to satisfy all of a low residual potential characteristic, linearity of EV curve, and a high sensitivity characteristic.

In order to obtain good concentration gradation characteristics and character quality in the aforementioned electrophotographic apparatus in which the digital gradation and the analog gradation are mixed as described above, an exposure light amount that can achieve both of the digital gradation and the analog gradation in good balance needs to be set. In this case, setting of such an exposure light amount is difficult unless the aforementioned three characteristics (sensitivity, residual potential, and linearity) are satisfied on the aforementioned EV curve of the layered organic photosensitive member. Particularly, when a space-saving optical system and a low-cost laser chip are used to respond to demands of size reduction and cost reduction of the electrophotographic apparatus, an exposure spot becomes large and the analog gradation characteristic becomes stronger. In such a case, improving the character quality and the digital gradation characteristic in a low-line-number halftone while maintaining the analog gradation characteristic is difficult and there is a demand for solving this problem by improving the layered organic photosensitive member.

Japanese Patent Application Laid-Open No. 2014-197237 states that a photosensitive member that has high sensitivity and that is less affected by humidity change is obtained by forming a charge generation layer using titanyl phthalocyanine and having a film thickness of 400 nm. Japanese Patent Application Laid-Open No. 2014-197237 states that this photosensitive member has a small half-value exposure amount in the case where the photosensitive member charged to a potential with an absolute value of 700 V is irradiated with light with a wavelength of 780 nm and an intensity of 0.15 $mW/cm^2$, and the change in the exposure potential with respect to humidity change is small.

Japanese Patent Application Laid-Open No. 2007-206349 describes an image formation method and an image forming apparatus that determine a charging potential and an image exposure amount depending on a film thickness of a photosensitive layer, a linearity near a half-value exposure amount on an EV curve, and a value of a surface potential at an exposure amount about twice the half-value exposure amount. The surface potential at the exposure amount about twice the half-value exposure amount is close to the residual potential. Accordingly, it can be said that the method described in Japanese Patent Application Laid-Open No. 2007-206349 is a method of determining an appropriate image exposure amount from the linearity of the EV curve and the residual potential by using the formula (1) in this literature. This technique can achieve a photosensitive member that maintains high resolution and high definition reproducibility for a long period from usage start even if the film thickness of the photosensitive layer is increased to increase the life.

Japanese Patent Application Laid-Open No. 2003-195577 describes a photosensitive member in which linearity near a half-value exposure amount on an EV curve is high when an absolute value of a charging potential is 600 V. This technique enables faithful development of each dot forming a digital latent image and enables high-speed output of a high-quality image with excellent resolution and gradation characteristics.

Japanese Patent Application Laid-Open No. 2002-072522 describes a photosensitive member in which a value obtained by dividing a half-value exposure amount $E_{1/2}$ by an exposure amount $E_{50}$ required to set the surface potential to −50 V is 0.25 or more. The lower the residual potential is, the smaller the $E_{50}$ is. Moreover, the higher the linearity is, the larger the $E_{1/2}$ is. Accordingly, this means that the residual potential is low and the linearity is high on an EV curve. An excellent surface potential attenuation characteristic is thereby obtained and gradation characteristics of an image are improved.

Japanese Patent Application Laid-Open No. 2001-183852 describes a photosensitive member with a high linearity in a range from a half-value exposure amount to a 1/5 exposure amount on an EV curve. A static charge image of one dot pixel can be thereby stably reproduced.

According to the studies of the present inventors, none of the electrophotographic photosensitive members and the image forming methods described in the aforementioned patent literatures performs optimization for satisfying the three characteristics of sensitivity, residual potential, and linearity on the EV curve. In recent years, the spot diameter of the laser cannot be reduced due to demands for size reduction and cost reduction of the electrophotographic apparatus. A problem of how to improve the character quality and the digital gradation characteristic in a low-line-number halftone while maintaining the analog gradation characteristic also in a high-speed process to achieve high productivity in such a situation has not been solved yet.

Accordingly, an object of the present invention is to provide an electrophotographic photosensitive member that exhibits high character quality and a digital gradation characteristic in a low-line-number halftone while maintaining an analog gradation characteristic in a high-speed process. Moreover, another object of the present invention is to provide a process cartridge and an electrophotographic apparatus using the electrophotographic photosensitive member.

SUMMARY OF THE INVENTION

The aforementioned objects are achieved by the present invention described below. Specifically, an electrophotographic photosensitive member according to the present invention is an electrophotographic photosensitive member comprising: a support; a charge generation layer on the support; and a charge transfer layer on the charge generation layer, wherein the electrophotographic photosensitive member is an organic photosensitive member, and $I_{1/2} \leq 0.170$ $\mu J/cm^2$, $AR \leq 0.370$, and $LR_i \leq 780$ $V \cdot cm^2/\mu J$ are satisfied, where, in an $I_{exp}$–$V_{exp}$ graph that is obtained according to <Measurement Method of NESA-EV Curve> described below at temperature of 23.5° C. and relative humidity of 50% RH in a case where a charging potential is $V_d$=500 V and in which a horizontal axis represents an exposure light irradiation amount $I_{exp}$ and a vertical axis represents an absolute value $V_{exp}$ of a surface potential after exposure, a light amount at $V_{exp}$=250 V in the graph is represented by $I_{1/2}$ [$\mu J/cm^2$], a maximum value of a product $S=I_{exp} \cdot V_{exp}$ [$V \cdot \mu J/cm^2$] of $I_{exp}$ and $V_{exp}$ in a range of $I_{exp}$=0.000 to $3.414 \cdot I_{1/2}$ [$\mu J/cm^2$] in the graph is represented by $S_{max}$, an intersection between an approximate straight line in a range of $I_{exp}$=0.000 to $0.100 \cdot I_{1/2}$ [$\mu J/cm^2$] and an approximate straight line in a range of $I_{exp}=(5 \cdot I_{1/2}-0.100)$ to $5 \cdot I_{1/2}$[$\mu J/cm^2$] in the graph is represented by Q, a light amount value at the point Q is represented by $I_i$ [$\mu J/cm^2$], a potential value at the point Q is represented by $V_i$ [V], and a product of $I_i$ and $V_i$ is represented by $S_i=I_i \cdot V_i$ [$V \cdot \mu J/cm^2$], a ratio between $S_i$ and $S_{max}$ is represented by $AR=S_i/S_{max}$, and a value obtained by dividing $V_i$ by $I_i$ is represented by $LR_i=V_i/I_i$ [$V \cdot cm^2/\mu J$], Moreover, in the electrophotographic photosensitive member according to the present invention, $I_{1/2}$, $AR=S_i/S_{max}$, and $LR_i=V_i/I_i$ described above satisfy $I_{1/2}\leq 0.170$ μJ/cm², AR≤0.500, and $LR_i\leq 520$ V·cm²/μJ.

<Measurement Method of NESA-EV Curve>

(1): The surface potential of the electrophotographic photosensitive member is set to 0V, (2): the electrophotographic photosensitive member is charged for 0.005 seconds such that the absolute value of the surface potential of the electrophotographic photosensitive member becomes $V_0$ [V], (3): 0.02 seconds after start of the charging, the charged electrophotographic photosensitive member is exposed continuously for t seconds to light with a wavelength of 805 nm and an intensity of 25 mW/cm² such that an exposure amount becomes $I_{exp}$[μJ/cm²], (4): 0.06 seconds after the start of the charging, the absolute value of the surface potential of the exposed electrophotographic photosensitive member is measured and the measured value is represented by $V_{exp}$ [V], (5): operations of (1) to (4) are repeated while changing $I_{exp}$ from 0.000 μJ/cm² to 0.850 μJ/cm² at intervals of 0.001 μJ/cm² by changing t to obtain $V_{exp}$ corresponding to each value of $I_{exp}$, and (6): $V_{exp}$ [V] in the case where t=0 and $I_{exp}$=0.000 μJ/cm² are set in the operation of (3) is referred to as charging potential $V_d$ [V] and $V_0$ [V] in the case where the operation of (2) is performed is set such that the value of $V_d$ becomes 500 V.

Further features of the present invention will become apparent from the following description of exemplary embodiments with reference to the attached drawings.

DESCRIPTION OF THE EMBODIMENTS

Figure 1:
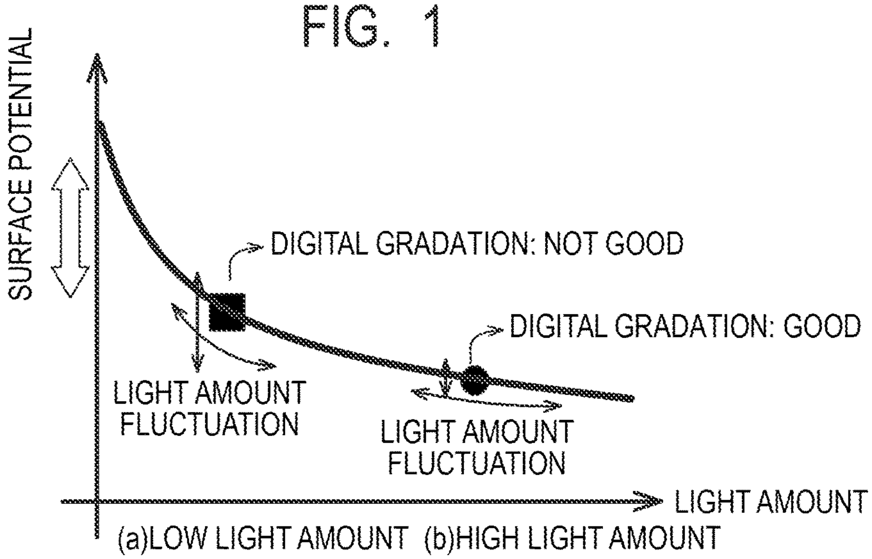
FIGS. 1, 1A, and 1B are conceptual diagrams each illustrating a barter relationship between an analog gradation and a digital gradation in an EV curve of a conventional photosensitive member.

The present invention is described in detail by using a preferable embodiment. Note that, in the present specification, voltages are described in absolute values.

An electrophotographic photosensitive member of the present invention is an electrophotographic photosensitive member including a support, a charge generation layer on the support, and a charge transfer layer on the charge generation layer. The electrophotographic photosensitive member of the present invention is an organic photosensitive member and relates to an electrophotographic photosensitive member as follows. Assume that, in an $I_{exp}$–$V_{exp}$ graph that is obtained according to <Measurement Method of NESA-EV Curve> described below at temperature of 23.5° C. and relative humidity of 50% RH in the case where a charging potential is $V_d$=500 V and in which the horizontal axis represents an exposure light irradiation amount $I_{exp}$ and the vertical axis represents an absolute value $V_{exp}$ of a surface potential after exposure, a light amount at $V_{exp}$=250 V in the graph is represented by $I_{1/2}$ [μJ/cm²], the maximum value of a product $S=I_{exp}\cdot V_{exp}$ [V·μJ/cm²] of $I_{exp}$ and $V_{exp}$ in a range of $I_{exp}$=0.000 to $3.414\cdot I_{1/2}$ [μJ/cm²] in the graph is represented by $S_{max}$ [V·μJ/cm²], an intersection between an approximate straight line in a range of $I_{exp}$=0.000 to $0.100\cdot I_{1/2}$ [μJ/cm²] and an approximate straight line in a range of $I_{exp}=(5\cdot I_{1/2}-0.100)$ to $5\cdot I_{1/2}$ [μJ/cm²] in the graph is represented by Q, an light amount value at the point Q is represented by $I_i$ [μJ/cm²], a potential value at the point Q is represented by $V_i$ [V], a product of $I_i$ and $V_i$ is represented by $S_i=I_i\cdot V_i$ [V·μJ/cm²], a ratio between $S_i$ and $S_{max}$ is represented by $AR=S_i/S_{max}$, and a value obtained by dividing $V_i$ by $I_i$ is represented by $LR_i=V_i/I_i$ [V·cm²/μJ]. In this case, $I_{1/2}\leq 0.170$ μJ/cm², AR≤0.370, and $LR_i\leq 780$ V·cm²/μJ are satisfied.

Moreover, the electrophotographic photosensitive member according to the present invention relates to an electrophotographic photosensitive member in which $I_{1/2}$, $AR=S_i/S_{max}$, and $LR_i=V_i/I_i$ described above satisfy $I_{1/2}\leq 0.170$ μJ/cm², AR≤0.500, and $LR_i\leq 520$ V·cm²/μJ.

<Measurement Method of NESA-EV Curve>

(1): The surface potential of the electrophotographic photosensitive member is set to 0V, (2): the electrophotographic photosensitive member is charged for 0.005 seconds such that the absolute value of the surface potential of the electrophotographic photosensitive member becomes $V_0$ [V], (3): 0.02 seconds after start of the charging, the charged electrophotographic photosensitive member is exposed continuously for t seconds to light with a wavelength of 805 nm and an intensity of 25 $mW/cm^2$ such that an exposure amount becomes $I_{exp}$[$\mu J/cm^2$], (4): 0.06 seconds after the start of the charging, the absolute value of the surface potential of the exposed electrophotographic photosensitive member is measured and the measured value is represented by $V_{exp}$ [V], (5): operations of (1) to (4) are repeated while changing $I_{exp}$ from 0.000 $\mu J/cm^2$ to 0.850 $\mu J/cm^2$ at intervals of 0.001 $\mu J/cm^2$ by changing t to obtain $V_{exp}$ corresponding to each value of $I_{exp}$, and (6): $V_{exp}$ [V] in the case where t=0 and $I_{exp}$=0.000 $\mu J/cm^2$ are set in the operation of (3) is referred to as charging potential $V_d$ [V] and $V_0$ [V] in the case where the operation of (2) is performed is set such that the value of $V_d$ becomes 500 V.

Furthermore, the present invention relates to a process cartridge that integrally supports the aforementioned electrophotographic photosensitive member and at least one unit selected from the group consisting of a charging unit, a development unit, and a cleaning unit and that is attachable to and detachable from a main body of an electrophotographic apparatus.

Moreover, the present invention relates to an electrophotographic apparatus including the aforementioned electrophotographic photosensitive member, a charging unit, an exposure unit, a development unit, and a transfer unit.

In the studies by the present inventors, photosensitive members of conventional techniques do not satisfy three characteristics of sensitivity, residual potential, and linearity on an EV curve at high levels. In recent years, a spot diameter of a laser cannot be reduced due to demands for size reduction and cost reduction of an electrophotographic apparatus. A technique of improving character quality and a digital gradation characteristic in a low-line-number halftone while maintaining an analog gradation characteristic also in a high-speed process for achieving high productivity as described above has not been achieved yet.

Moreover, in the conventional techniques, a method of making specifications for satisfying the three characteristics of sensitivity, residual potential, and linearity on the EV curve at high levels are insufficient in view of the aforementioned object. Furthermore, means for evaluating basic characteristics for measurement of the EV curve is insufficient for achieving high-speed processes in recent years and those expected in the future.

Accordingly, the present inventors have made specifications while maintaining optimal balance among the three characteristics of sensitivity, residual potential, and linearity on the EV curve. Moreover, the present inventors found that it is only necessary to appropriately measure the EV curve for the aforementioned purpose and specify, measure, and design the photosensitive member as follows to solve the aforementioned problems.

<Design of Photosensitive Member>

In order to achieve an object of achieving both of the analog gradation and the digital gradation in good balance, the photosensitive member needs to achieve three characteristics of high sensitivity, low residual potential, and high linearity at high levels while maintaining an optimal balance among these characteristics.

(Relationships Between EV Curve and Stabilities of Analog Gradation and Digital Gradation)

Figure 1A:
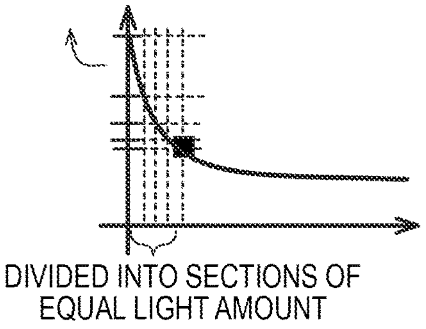
Figure 1B:
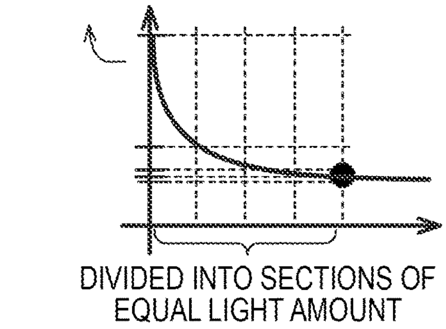

FIG. 1 illustrates a barter relationship between the analog gradation and the digital gradation in the EV curve of a conventional photosensitive member. In order to improve the analog gradation, a change of the surface potential in the case where light amount fluctuates needs to be brought closer to a linear shape. To this end, (a) low light amount may be selected as an image exposure amount in the EV curve of FIG. 1. FIG. 1A illustrates (a) low light amount in the EV curve in an enlarged manner. From this enlarged diagram, it can be found that, when the EV curve is divided into sections of a fixed image exposure amount (divided into sections of an equal light amount), ranges of the surface potential corresponding to the respective divided sections are relatively equal. Accordingly, in a low light amount, the analog gradation is relatively improved. Meanwhile, FIG. 1B illustrates the EV curve in the case where (b) high light amount is selected as the image exposure amount, in an enlarged manner. From this enlarged diagram, it can be found that, when the EV curve is divided into sections of the equal light amount, ranges of the surface potential corresponding to the respective divided sections are far from equal. Accordingly, the analog gradation is poorer in a high light amount.

Meanwhile, in order to improve the digital gradation, one dot needs to be dark and stable. Accordingly, (b) high light amount in the EV curve of FIG. 1 may be selected as the image exposure amount. In this case, since the absolute value of the tilt of the EV curve is small as illustrated in FIG. 1, the surface potential change is stable with respect to the light amount fluctuation and, as a result, one dot is stable. Meanwhile, when (a) low light amount is selected as the image exposure amount, the absolute value of the tilt of the EV curve is large as illustrated in FIG. 1. Accordingly, the surface potential is unstable with respect to the light amount fluctuation and, as a result, one dot is unstable.

As described above, the analog gradation and the digital gradation are generally in a barter relationship based on which light amount on the EV curve is selected as the image exposure amount.

Meanwhile, in the EV curve of the conventional photosensitive member in FIG. 1, when (a) low light amount is selected as the image exposure amount, the linearity between the light amount and the surface potential is insufficient and, when (b) high light amount is selected as the image exposure amount, the stability of the surface potential with respect to the light amount fluctuation is insufficient and the residual potential is high.

Figure 2:
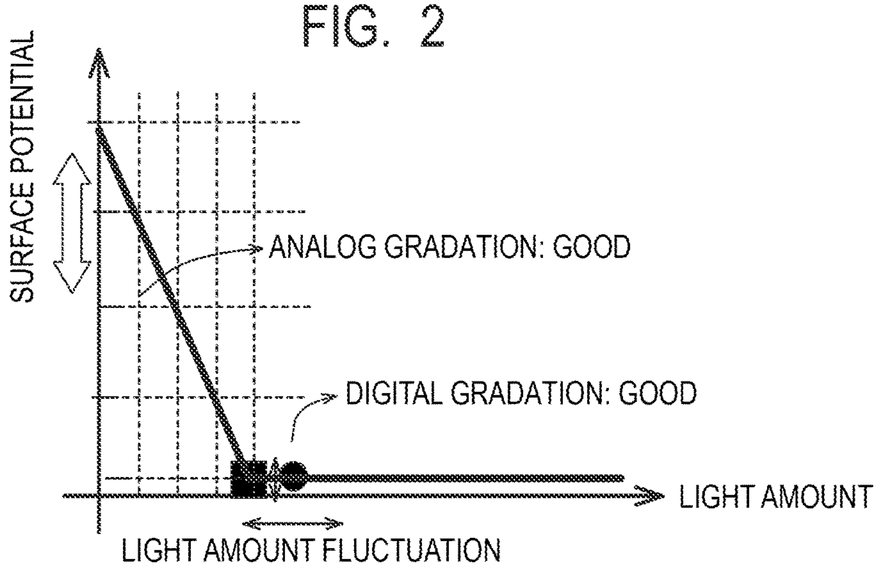
FIG. 2 is a conceptual diagram illustrating that both of the analog gradation and the digital gradation can be achieved in good balance in the EV curve of a photosensitive member satisfying specifications for the EV curve in the present invention.

Next, FIG. 2 illustrates a relationship between the analog gradation and the digital gradation in an EV curve of a photosensitive member of the present invention. Since the photosensitive member of the present invention has a low residual potential and a high linearity, bending in the case where the EV curve changes from the low light amount side to the high light amount side is sharp. Accordingly, the region of (a) low light amount advantageous for the analog gradation and the region of (b) high light amount advantageous for the digital gradation illustrated in FIG. 1 can be brought closer. As illustrated in FIG. 2, in the EV curve in which both regions are close to each other, since the linearity of the EV curve is high in the region of the low light amount, when the change of the image exposure amount is equally divided, the corresponding change of the surface potential is also divided into sections that are almost equal. At the same time, the stability of one dot with respect to the light amount fluctuation is high in the region of the high light amount. Moreover, since the residual potential is low, a width between upper and lower limits of the surface potential usable in the analog gradation (hereinafter, referred to as "latent image contrast") is increased and this also contributes to an improvement of the analog gradation. Furthermore, since the latent image contrast is increased and the concentration of one dot is high and stable, this also contributes to an improvement of the digital gradation.

The NESA-EV curve to be described later is measured for each photosensitive member and is independent of processes. However, the EV curve measured in a laser beam printer depends on the processes. Particularly, at high process speed, when a mobility of a photogenerated carrier in the photosensitive member is low, the EV curve becomes poorer. Moreover, when irradiation time of image exposure light is short or the number of times of irradiation is small due to an increase in process speed, employing of multiple laser beams, and the like, the density of the photogenerated carrier in the photosensitive member per unit time and unit area increases. Accordingly, when there are many traps in an interface surface or a bulk, the EV curve becomes poorer (this is referred to as a "reciprocity law failure" characteristic of the photosensitive member). To avoid these problems, the mobility of photogenerated carrier needs to be high and the number of such traps needs to be small. A highly sensitive photosensitive member satisfies these conditions. Accordingly, in order to stably achieve both of the analog gradation and the digital gradation in good balance in high-speed processes in recent years and the future, the photosensitive member of the present invention needs to satisfy high sensitivity in addition to low residual potential and high linearity on the EV curve.

(Specification of EV Curve)

In the present invention, the NESA-EV curve is used as the EV curve. The NESA-EV curve is an $I_{exp}$–$V_{exp}$ graph obtained by the following method of measuring the NESA-EV curve. In the present invention, each of characteristic values is determined as follows. In the NESA-EV curve in the case where the charging potential is $V_d$=500 V, the light amount at $V_{exp}$=250 V in the graph is represented by $I_{1/2}$ [μJ/cm$^2$]. S is defined as $S=I_{exp}\cdot V_{exp}$ [V·μJ/cm$^2$]. The maximum value of S [V·μJ/cm$^2$] within a range of $I_{exp}$=0.000 to $3.414\cdot I_{1/2}$ [μJ/cm$^2$] in the graph is represented by $S_{max}$ [V·μJ/cm$^2$]. An approximate straight line in a range of $I_{exp}$=0.000 to $0.100\cdot I_{1/2}$ [μJ/cm$^2$] in the graph is obtained. An approximate straight line in a range of $I_{exp}=(5\cdot I_{1/2}-0.100)$ to $5\cdot I_{1/2}$ [μJ/cm$^2$] is obtained. An intersection between these two approximate straight lines is represented by Q. A light amount value at the point Q is presented by $I_i$ [μJ/cm$^2$], a potential value at the point Q is represented by $V_i$ [V], and a product of $I_i$ and $V_i$ is represented by $S_i=I_i\cdot V_i$ [V·μJ/cm$^2$]. It is defined that $AR=S_i/S_{max}$ and $LR_i=V_i/I_i$ [V·cm$^2$/μJ].

Figure 3:
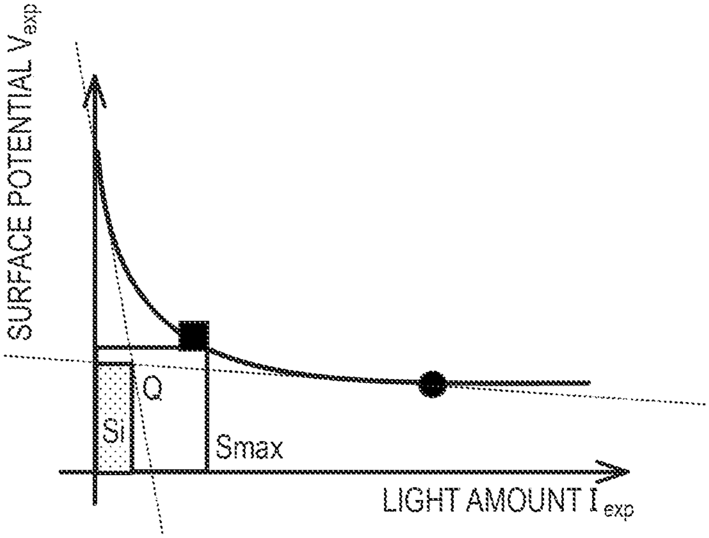
FIG. 3 is a conceptual diagram illustrating $S_{max}$ [V·μJ/cm²] and $S_i$ [V·μJ/cm²] in the EV curve of the conventional photosensitive member.

FIG. 3 illustrates a conceptual diagram illustrating $S_{max}$ [V·μJ/cm$^2$] and $S_i$ [V·μJ/cm$^2$] in the EV curve of the conventional photosensitive member.

$S_{max}$ means the maximum value of S [V·μJ/cm$^2$] calculated from $S=I_{exp}\cdot V_{exp}$ in the range in which the exposure amount is $I_{exp}$=0.000 to $3.414\cdot I_{1/2}$ [μJ/cm$^2$]. In this case, $I_{1/2}$ is a half-value exposure amount and $V_{exp}$ is the absolute value of the surface potential in the case where exposure is performed at a light amount of $I_{exp}$. The value "3.414" is explained as follows. Let us consider any point (x, y) on a quadratic function opening upward, a vertex $(x_0, y_0)$ of the quadratic function, and a point $(x_1, y_1=(y+y_0)/2)$ that takes an intermediate value of y coordinate values of these two points on the quadratic function. In this case, a ratio between a distance from (x, 0) to $(x_1, 0)$ (corresponding to the half-value exposure amount) and a distance from (x, 0) to $(x_0, 0)$ (corresponding to a residual potential exposure amount) is 3.414. This ratio is always $(x_0-x)/(x_1-x)=2/(2-\sqrt{2})\approx 3.414$ for any quadratic function opening upward. Accordingly, in the range of $I_{exp}$=0.000 to $3.414\cdot I_{1/2}$ [μJ/cm$^2$], the lower the sensitivity and the residual potential are and the higher the linearity is, the larger the $S_{max}$ is.

Meanwhile, $S_i$ is defined as follows. The intersection between the approximate straight line in the range of $I_{exp}$=0.000 to $0.100\cdot I_{1/2}$ [μJ/cm$^2$] and the approximate straight line in the range of $I_{exp}=(5\cdot I_{1/2}-0.100)$ to $5\cdot I_{1/2}$ [μJ/cm$^2$] is represented by Q. When the light amount value at the point Q is represented by $I_i$ [μJ/cm$^2$] and the potential value at the point Q is represented by $V_i$ [V], the product of $I_i$ and $V_i$ is $S_i$. From this definition, the higher the sensitivity is and the lower the residual potential is, the smaller the $S_i$ is.

Let us consider a ratio between $S_{max}$ and $S_i$ defined as described above: $AR=S_i/S_{max}$. The sensitivity affects $S_i$ and $S_{max}$ in a reverse direction. Accordingly, the sensitivity does not affect the magnitude of AR much. Thus, the lower the residual potential is or the higher the linearity is, the smaller the AR is and effects of the sensitivity on AR is relatively small. Moreover, considering the aspect ratio of $S_i$:$LR_i=V_i/I_i$, the lower the sensitivity and the residual potential are and the higher the linearity is, the smaller the $LR_i$ is from the definition thereof. Particularly, low residual potential strongly affects $LR_i$.

The present inventors found that the aforementioned $I_{1/2}$, AR, and $LR_i$ satisfying one of the following sets of specifications is optimal for achieving the three characteristics of high sensitivity, low residual potential, and high linearity at high levels while maintaining an optimal balance for the purpose of achieving both of the analog gradation and the digital gradation in good balance:

$$I_{1/2}\leq 0.170\ \mu J/cm^2, AR\leq 0.370, \text{ and } LR_i\leq 780\ V\cdot cm^2/\mu J; \quad (A)$$

or $$I_{1/2}\leq 0.170\ \mu J/cm^2, AR\leq 0.500, \text{ and } LR_i\leq 520\ V\cdot cm^2/\mu J. \quad (B)$$

Figure 4:
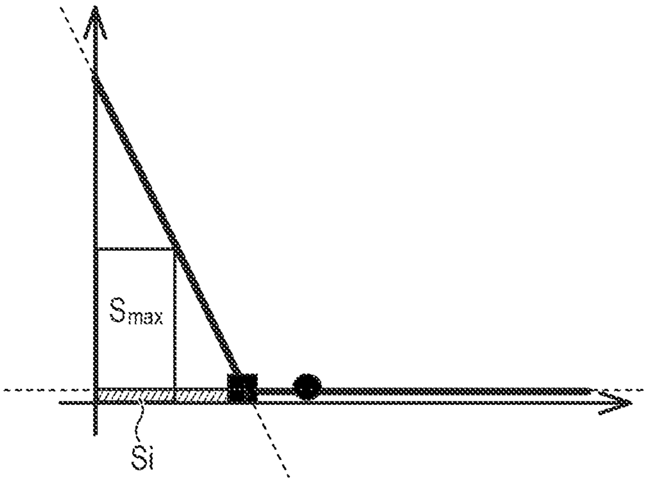
FIG. 4 is a conceptual diagram illustrating $S_{max}$ [V·μJ/cm²] and $S_i$ [V·μJ/cm²] in the EV curve of the photosensitive member in the present invention.

FIG. 4 illustrates a conceptual diagram of an EV curve of the photosensitive member of the present invention that satisfies these specifications. As apparent from FIG. 4, both of $AR=S_i/S_{max}$ and $LR_i=V_i/I_i$ are small when low residual potential and high linearity are satisfied. Moreover, it can be found that an effect of low residual potential is great.

The specification of (A) in which $I_{1/2}\leq 0.170$ μJ/cm$^2$, AR≤0.370, and $LR_i\leq 780$ V·cm$^2$/μJ contributes to high linearity, rather than low residual potential, at a greater degree than the specification of (B) in which $I_{1/2}\leq 0.170$ μJ/cm$^2$, AR≤0.500, and $LR_i\leq 520$ V·cm$^2$/μJ. Specifically, this means that, when the low residual potential and the high linearity complement each other while maintaining a balance with the high sensitivity as described in (A) or (B), the object of the present invention can be achieved.

Figure 5A:
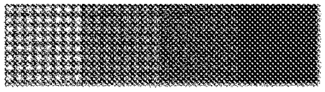
FIGS. 5A, 5B, 5C, and 5D are diagrams explaining the analog gradation and the digital gradation and explaining a change in a ratio of mixing between the analog gradation and the digital gradation in an actual gradation due to a size relationship between the size of one dot and an exposure light spot diameter.
Figure 5B:
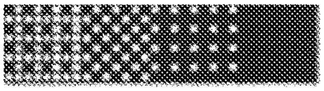
Figure 5C:
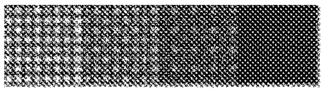
Figure 5D:
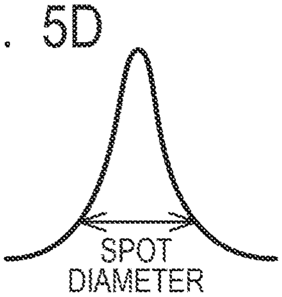

In a situation where a spot diameter of a laser cannot be reduced due to demands for size reduction and cost reduction of an electrophotographic apparatus in recent years, the analog gradation characteristic becomes stronger as illustrated FIGS. 5A to 5D. FIGS. 5A to 5C each illustrate a 600 dpi pattern in which one dot is 42 μm×42 μm. FIG. 5A illustrates the analog gradation (case where control is performed by using macro average potential), FIG. 5B illustrates the digital gradation (case where control is performed by using micro area ratio), and FIG. 5C illustrates an example of a pattern obtained when the spot diameter of the laser cannot be sufficiently controlled. FIG. 5D is a schematic diagram of a spot diameter of laser-light amount distribution. When the spot diameter is large, the analog gradation characteristic is strong and, when the spot diameter is small, the digital gradation characteristic is strong. In this case, the specification of $LR_i$ that reflects the low residual potential characteristic more is particularly important to improve the character quality and the digital gradation characteristic in the low-line-number halftone while maintaining the analog gradation characteristic.

(Method of Measuring NESA-EV Curve)

The NESA-EV curve is obtained by the following measurement method. Note that, in the technical field, it is relatively common for the EV curve to be measured in a laser beam printer under specific process conditions. Meanwhile, the NESA-EV curve is not measured in a printer but is measured only for the photosensitive member under specific conditions as described below and is defined for each photosensitive member.

The NESA-EV curve is measured as follows at temperature of 23.5° C. and relative humidity of 50% RH with the charging potential set to $V_d$=500 V.

(1): The surface potential of the electrophotographic photosensitive member is set to 0V, (2): the electrophotographic photosensitive member is charged for 0.005 seconds such that the absolute value of the surface potential of the electrophotographic photosensitive member becomes $V_0$ [V], (3): 0.02 seconds after the start of the charging, the charged electrophotographic photosensitive member is exposed continuously for t seconds to light with a wavelength of 805 nm and an intensity of 25 mW/cm$^2$ such that the exposure amount becomes $I_{exp}$ [μJ/cm$^2$], (4): 0.06 seconds after the start of the charging, the absolute value of the surface potential of the exposed electrophotographic photosensitive member is measured and the measured value is represented by $V_{exp}$ [V], (5): operations of (1) to (4) are repeated while changing $I_{exp}$ from 0.000 μJ/cm$^2$ to 0.850 μJ/cm$^2$ at intervals of 0.001 μJ/cm$^2$ by changing t to obtain $V_{exp}$ corresponding to each value of $I_{exp}$, and (6): $V_{exp}$ [V] in the case where t=0 and $I_{exp}$=0.000 μJ/cm$^2$ are set in the operation of (3) is referred to as charging potential $V_d$ [V] and $V_0$ [V] in the case where the operation of (2) is performed is set such that the value of $V_d$ becomes 500 V.

A specific example of a measurement system of the NESA-EV curve is described. However, the measurement system is not limited to the following method as long as the method of measuring the NESA-EV curve can be executed.

Figure 6:
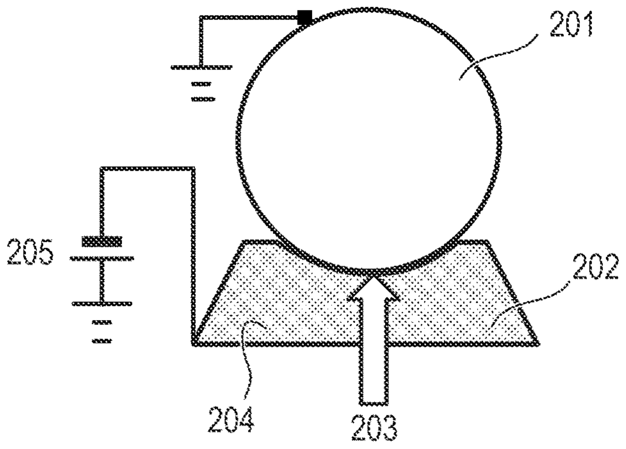
FIG. 6 is a diagram schematically illustrating an apparatus used to measure an NESA-EV curve.

A transparent quartz glass whose entire surface is subjected to optical polishing and in which a transparent ITO electrode is vapor-deposited on the surface to form a sheet resistance of 1,000 Ω/sq or less is prepared (hereinafter, referred to as "NESA glass"). As illustrated in FIG. 6, a surface of the photosensitive member 201 is brought into tight contact with the NESA glass 202 in which the transparent ITO electrode 204 is vapor-deposited on the surface. In this case, glycerin is provided between the NESA glass 202 and the photosensitive member 201 such that these two members surely come into tight contact. Note that, a smooth flat NESA glass is used when the photosensitive member has a flat shape and a curved NESA glass as illustrated in FIG. 6 is used when the photosensitive member has a cylindrical shape. Applying voltage to the NESA glass in this state with a high-voltage power supply 205 can charge a surface of the photosensitive member. Moreover, irradiating the surface of the photosensitive member with flat light with a wavelength of 805 nm and an intensity of 25 mW/cm$^2$ from a lower surface of the NESA glass can expose 203 the surface of the photosensitive member and cause light attenuation of the surface potential.

Using the aforementioned measurement system allows charging and exposure to be repeated at a higher cycle than process speed of an electrophotographic apparatus in recent years or that expected in the future while irradiating the photosensitive member only once for a short time with light of 25 mW/cm$^2$. The light of 25 mW/cm$^2$ is stronger than exposure light used for irradiation of the photosensitive member in the electrophotographic apparatus of recent years or that expected in the future. A large amount of data on light amounts at intervals of 0.001 J/cm$^2$ is thereby stably and easily obtained and the NESA-EV curve of the photosensitive member of the present invention and the characteristic values calculated from the NESA-EV curve can be obtained. At the same time, the aforementioned measurement method achieved by using this measurement system can be used for evaluation of photosensitive member characteristics also when the process speed increases and the exposure irradiation time becomes shorter in recent years or the future. Furthermore, the aforementioned measurement method can be used for the evaluation of the photosensitive member characteristics, while responding to a decrease in the number of times of exposure that occurs when the exposure method changes from a laser scanning optical system that is a current mainstream to an LED array. Particularly, the light irradiation conditions in which the intensity is 25 mW/cm$^2$ and exposure is performed once for a short time are sufficiently tough conditions for the EV curve measurement method into the future, in view of the reciprocity law failure characteristics of the photosensitive member.

[Electrophotographic Photosensitive Member]

Figure 7:
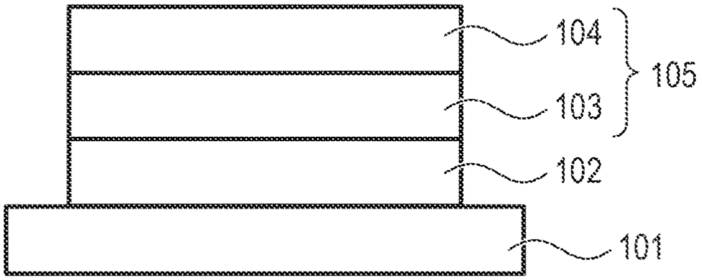
FIG. 7 is a diagram illustrating an example of a layer configuration of the electrophotographic photosensitive member in the present invention.

The electrophotographic photosensitive member of the present invention is an organic photosensitive member including a support, a charge generation layer on the support, and a charge transfer layer on the charge generation layer. The charge generation layer contains a charge generation substance and the charge transfer layer contains a charge transfer substance. The organic photosensitive member refers to a photosensitive member in which a main component of layers formed on the support is a resin. FIG. 7 is a diagram illustrating in an example of a layer configuration of the electrophotographic photosensitive member. In FIG. 7, reference sign 101 denotes the support, 102 an undercoat layer, 103 the charge generation layer, 104 the charge transfer layer, and 105 a photosensitive layer. In the present invention, the undercoat layer 102 may be omitted.

Moreover, the photosensitive member of the present invention needs to satisfy $$I_{1/2} \leq 0.170\ \mu J/cm^2, AR \leq 0.370, \text{ and } LR_i \leq 780\ V \cdot cm^2/\mu J; \quad (A)$$

or $$I_{1/2} \leq 0.170\ \mu J/cm^2, AR \leq 0.500, \text{ and } LR_i \leq 520\ V \cdot cm^2/\mu J \quad (B)$$

where, in the $I_{exp}$–$V_{exp}$ graph that is obtained according to the aforementioned <Measurement Method of NESA-EV Curve> at temperature of 23.5° C. and relative humidity of 50% RH in the case where the charging potential is $V_d$=500 V and in which the horizontal axis represents $I_{exp}$ and the vertical axis represents $V_{exp}$, the light amount at $V_{exp}$=250 V in the graph is represented by $I_{1/2}$ [μJ/cm$^2$], the maximum value of S [V·μJ/cm$^2$] calculated from $S=I_{exp} \cdot V_{exp}$ in the range of $I_{exp}$=0.000 to 3.414·$I_{1/2}$ [μJ/cm$^2$] in the graph is represented by $S_{max}$ [V·μJ/cm$^2$], the intersection between the approximate straight line in the range of $I_{exp}$=0.000 to 0.100·$I_{1/2}$ [μJ/cm$^2$] and the approximate straight line in the range of $I_{exp}$=(5·$I_{1/2}$–0.100) to 5·$I_{1/2}$ [μJ/cm$^2$] in the graph is represented by Q, the light amount value at the point Q is represented by $I_i$ [μJ/cm$^2$], the potential value at the point Q is represented by $V_i$[V], and the product of $I_i$ and $V_i$ is represented by $S_i = I_i \cdot V_i$[V·μJ/cm$^2$], the ratio between $S_i$ and $S_{max}$ is represented by $AR = S_i/S_{max}$, and the value obtained by dividing $V_i$ by $I_i$ is represented by $LR_i = V_i/I_i$[V·cm$^2$/μJ].

Moreover, from a viewpoint of improving both of an image on the high light side where the dot area ratio is low and an image on the shadow side where the dot area ratio is high, the photosensitive member is preferably configured such that AR≤0.370 and $LR_i$≤520 V·cm$^2$/μJ to satisfy both of (A) and (B) described above. When AR≤0.370 and $LR_i$≤520 V·cm$^2$/μJ, and the balance between the low residual potential and the high linearity is further improved also in a high-speed process in which the spot diameter of the laser is 80 m and printing speed is 100 ppm (500 mm/sec). As a result, the gradations on the high light side and the shadow side are both improved.

Moreover, from a viewpoint of improving reproducibility of outline characters with a small font size by further improving a large-line-number image on the shadow side, it is more preferable that the aforementioned AR satisfies AR≤0.100. When AR≤0.100, the visibility of outline characters of 6 pt on the shadow side is improved also in a high-speed process in which the spot diameter of the laser is 80 m and the printing speed is 100 ppm (500 mm/sec).

Meanwhile, from a viewpoint of improving reproducibility of normal characters with a small font size by further improving a low-line-number image on the high light side, it is more preferable that the aforementioned $LR_i$ satisfies $LR_i$≤60 V·cm$^2$/μJ. When $LR_i$≤60 V·cm$^2$/μJ, the visibility of normal characters of 3 pt on the high light side is improved also in a high-speed process in which the spot diameter of the laser is 80 m and the printing speed is 100 ppm (500 mm/sec).

Moreover, from a viewpoint of improving reproducibility of isolated one dot in the case where the charging potential is set to a low level for the purpose of energy saving or the like, the aforementioned value $V_r$ of $V_{exp}$ at $I_{exp} = 5 \cdot I_{1/2}$ [μJ/cm$^2$] on the $I_{exp}$–$V_{exp}$ graph is preferably $V_r$≤70 V. More preferably, $V_r$≤10 V. When $V_r$≤70 V, reproducibility of isolated one dot at $V_d$=450 V is improved also in a high-speed process in which the spot diameter of the laser is 80 m and the printing speed is 100 ppm (500 mm/sec). When $V_r$≤10V, the concentration of the isolated one dot pattern becomes even higher.

A method of manufacturing the electrophotographic photosensitive member of the present invention includes a method in which application liquids of the respective layers to be described later are prepared, applied in the desired order of the layers, and dried. In this case, an application method of the application liquids includes immersion application, spray application, inkjet application, roll application, die application, blade application, curtain application, wire bar application, ring application, and the like. Among these, the immersion application is preferable from viewpoints of efficiency and productivity.

The support and the layers are described below.

<Support>

In the present invention, the electrophotographic photosensitive member includes the support. The support is preferably an electrically-conductive support that is electrically conductive. Moreover, the shape of the support includes a cylindrical shape, a belt shape, a sheet shape, and the like and, among these, the cylindrical support is preferable. Moreover, a surface of the support may be subjected to a blast treatment, a machining treatment, or the like.

Metal, resin, glass, or the like is preferable as the material of the support.

The metal includes aluminum, iron, nickel, copper, gold, stainless steel, and alloys of these metals. Among these, an aluminum support using aluminum is preferable.

When the material is resin or glass, the support may be subjected to a treatment such as mixing or coating of an electrically-conductive material to be made electrically conductive.

The support of the present invention may be used with the surface of the support anodized in an acidic solution containing an oxidant. In this case, for example, inorganic acids such as sulfuric acid and chromic acid and organic acids such as oxalic acid and sulfonic acid may be used as electrolyte in the anodization treatment. Conditions such as applied voltage, current density, treatment temperature, and time can be selected depending on the film thickness and the type of the aforementioned electrolyte. Moreover, the anodized surface used in the electrophotographic photosensitive member of the present invention may be subjected to an electrolytic treatment and then to a pore sealing treatment. The pore sealing treatment may be a hot-water treatment, a vapor treatment, or a treatment using various pore sealing agents such as nickel acetate and nickel fluoride. The treatment using nickel acetate in which fine pores can be efficiently subjected to the pore sealing treatment is preferable.

<Electrically-Conductive Layer>

In the present invention, an electrically-conductive layer may be provided on the support. Providing the electrically-conductive layer can hide scratches and unevenness on the surface of the support and enables control of light reflection on the support surface.

The electrically-conductive layer preferably contains an electrically-conductive particle and a resin.

A material of the electrically-conductive particle includes a metal oxide, a metal, carbon black, and the like.

The metal oxide includes zinc oxide, aluminum oxide, indium oxide, silicon oxide, zirconium oxide, tin oxide, titanium oxide, magnesium oxide, antimony oxide, bismuth oxide, and the like. The metal includes aluminum, nickel, iron, nichrome, copper, zinc, silver, and the like.

Among these, the metal oxide is preferably used as the electrically-conductive particle and titanium oxide, tin oxide, and zinc oxide are particularly preferably used.

When the metal oxide is used as the electrically-conductive particle, a surface of the metal oxide may be treated with a silane coupling agent or the metal oxide may be doped with an element such as phosphorus or aluminum or an oxide thereof. The element or the oxide thereof used for doping includes phosphorus, aluminum, niobium, tantalum, and the like.

Moreover, the electrically-conductive particle may have a layered configuration including a core particle and a coating layer coating the particle. The core particle includes titanium oxide, barium sulfate, zinc oxide, and the like. The coating layer includes metal oxides such as tin oxide and titanium oxide Furthermore, when the metal oxide is used as the electrically-conductive particle, the mean volume particle size thereof is preferably 1 nm or more to 500 nm or less, more preferably, 3 nm or more to 400 nm or less.

The resin includes a polyester resin, a polycarbonate resin, a polyvinyl acetal resin, an acrylic resin, a silicone resin, an epoxy resin, a melamine resin, a polyurethane resin, a phenol resin, an alkyd resin, and the like.

Moreover, the electrically-conductive layer may further contain a masking agent such as a silicone oil, a resin particle, or titanium oxide.

The average film thickness of the electrically-conductive layer is preferably 1 μm or more to 50 μm or less, particularly preferably, 3 μm or more to 40 μm or less.

The electrically-conductive layer can be formed by preparing an application liquid for the electrically-conductive layer that contains the aforementioned materials and a solvent, forming an application film of this application liquid on a lower layer or the support, and drying the application liquid. The solvent used in the application liquid includes an alcohol-based solvent, a sulfoxide-based solvent, a ketone-based solvent, an ether-based solvent, an ester-based solvent, an aromatic hydrocarbon-based solvent, and the like. A dispersion method for dispersing the electrically-conductive particle in the application liquid for the electrically-conductive layer includes methods using a paint shaker, a sand mill, a ball mill, and a liquid impingement type high-speed disperser.

<Undercoat Layer>

In the present invention, the undercoat layer may be provided on the support or the electrically-conductive layer. Providing the undercoat layer can improve a bonding function between layers and provide a charge injection inhibiting function.

The undercoat layer preferably contains a resin. Moreover, the undercoat layer may be formed as a cured film by polymerizing a composition containing a monomer with a polymerizable functional group.

The resin includes a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, a cellulose resin, and the like.

The polymerizable functional group included in the monomer with the polymerizable functional group includes an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride structure, a carbon-carbon double bond, and the like.

Moreover, the undercoat layer may further contain an electron transfer substance, a metal oxide, a metal, an electrically-conductive macromolecule, and the like to improve electrical characteristics. Among these, the electron transfer substance and the metal oxide are preferably used.

Particularly, selection of the electron transfer substance, the metal oxide, the metal, the electrically-conductive macromolecule, and the resin as well as control of a blend ratio thereof and the like are important. Such appropriate selection and control as well as appropriate selection of the photosensitive layer on the undercoat layer allow a photocarrier generated in the charge generation layer to smoothly flow toward the support and the photosensitive member satisfying the specifications of the EV curve of the present invention can be obtained.

The electron transfer substance includes a quinone compound, an imide compound, a benzimidazole compound, a cyclopentadienylidene compound, a fluorenone compound, a xanthone compound, a benzophenone compound, a cyanovinyl compound, an aryl halide compound, a silole compound, a boron-containing compound, and the like. The undercoat layer may be formed as a cured film by using an electron transfer substance including the polymerizable functional group as the electron transfer substance and copolymerizing it with the aforementioned monomer with the polymerizable functional group.

The metal oxide includes tin indium oxide, tin oxide, indium oxide, titanium oxide, zinc oxide, aluminum oxide, silicon dioxide, and the like. The metal includes gold, silver, aluminum, and the like. Among these, a titanium oxide particle whose surface is subjected to a silane treatment and whose crystal structure is a rutile type or an anatase type is preferable from a viewpoint of allowing the photocarrier generated in the charge generation layer of the present invention to smoothly flow toward the support. At least one type of compound selected from the group consisting of vinyltrimethoxysilane, vinyltriethoxysilane, and vinylmethyldimethoxysilane is preferably used in the silane treatment of the surface. Providing hydrophobic characteristics by performing the silane treatment can suppress carrier transfer inhibition caused by moisture adsorption and using the titanium oxide particle of the rutile type or the anatase type can reduce carrier traps. Moreover, from a viewpoint of further suppressing the carrier transfer inhibition, the titanium oxide particle is more preferably a rutile type titanium oxide particle with low photocatalytic activity, even more preferably a titanium oxide particle with a rutile percentage of 90% or more. In addition, from a viewpoint of preventing a binding resin from impairing electrical conductivity of the titanium oxide particle, a volume ratio between the titanium oxide particle and the binding resin (the volume of the titanium oxide particle to the volume of the binding resin) is preferably 0.2 or more. If the ratio is less than 0.2, the binding resin sometimes inhibits smooth transfer of the photocarrier.

Moreover, the undercoat layer may further contain an additive.

The average film thickness of the undercoat layer is preferably 0.1 μm or more to 50 μm or less, more preferably 0.2 μm or more to 40 μm or less, particularly preferably 0.3 μm or more to 30 μm or less.

The undercoat layer can be formed by preparing an application liquid for the undercoat layer that contains the aforementioned materials and a solvent, forming an application film of the application liquid on a lower layer or the support, and drying and/or curing the application liquid. The solvent used in the application liquid includes an alcohol-based solvent, a ketone-based solvent, an ether-based solvent, an ester-based solvent, an aromatic hydrocarbon-based solvent, and the like.

<Charge Generation Layer>

The charge generation layer needs to contain the charge generation substance and a resin.

The charge generation substance includes an azo pigment, a perylene pigment, a polycyclic quinone pigment, an indigo pigment, a phthalocyanine pigment, and the like. Among these, the phthalocyanine pigment is preferable from a viewpoint that high sensitivity necessary in the present invention is likely to be obtained.

In comparison of the phthalocyanine pigment and the azo pigment as the charge generation substance, the azo pigment is an interface type in which a position where the charge is generated is at an interface between the charge generation layer and the charge transfer layer while the phthalocyanine pigment is a bulk type in which a position where the charge is generated is at a bulk of the charge generation layer (reference literature: Minoru Umeda, "Extrinsic Photocarrier Generation Process and Kinetics of a Layered Organic Photoreceptor", Journal of the Chemical Society of Japan, 1996, No. 11, pp. 932-937). Accordingly, when the phthalocyanine pigment is used as the charge generation substance, the amount of photogenerated carrier can be more easily increased than in the azo pigment by increasing the charge generation layer film thickness. As a result, when the phthalocyanine pigment is used as the charge generation substance, a photosensitive member with high sensitivity in the present invention can be easily obtained.

Among phthalocyanine pigments, a titanyl phthalocyanine pigment or a hydroxygallium phthalocyanine pigment is preferable because high light sensitivity can be stably obtained. Moreover, a hydroxygallium phthalocyanine crystal that is described in Japanese Patent Application Laid-Open No. 2000-137340 and that has strong peaks at Bragg angles 2θ of 7.4°±0.3° and 28.2°±0.3° in CuKα characteristic X-ray diffraction or a titanyl phthalocyanine crystal that is described in Japanese Patent Application Laid-Open No. 2000-137340 and that has a strong peak at a Bragg angle 2θ of 27.2°±0.3° in CuKα characteristic X-ray diffraction are more preferable. Among such crystals, a hydroxygallium phthalocyanine crystal that is described in the example of Japanese Patent Application Laid-Open No. 2018-189692 and that contains 0.4% or more to 3.0% or less by mass of a compound with a structure illustrated in the following formula (A1) by in the crystal is particularly preferable.

(A1)

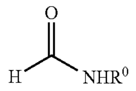

($R^0$ in the aforementioned formula (A1) represents a methyl group, a propyl group, or a vinyl group)

This is based on the viewpoint of improving the sensitivity while reducing the residual potential by preventing an interface between the resin and the pigment dispersed in the resin from becoming a charge trap.

In the aforementioned hydroxygallium phthalocyanine crystal that contains 0.4% or more to 3.0% or less by mass of the compound with the structure illustrated in the following formula (A1) in the crystal, the sizes of the crystal particles are aligned to a size as large as the charge generation layer film thickness. The reason for this is also described in Japanese Patent Application Laid-Open No. 2018-189692. Accordingly, quantum efficiency determined from the Onsager's equation described in Japanese Patent Application Laid-Open No. 2018-189692 and optical absorptance determined from the Beer-Lambert equation can both have high values. Hence, there is no need to make the charge generation layer film thickness excessively large to improve sensitivity and it is possible to suppress an interface trap amount between the charge generation substance (crystal particle) and the resin that tends to increase when the film thickness is increased, and to reduce the residual potential.

The content of the charge generation substance in the charge generation layer is preferably 40% or more to 85% or less by mass with respect to the total mass of the charge generation layer, more preferably 60% or more to 80% or less by mass.

The resin includes a polyester resin, a polycarbonate resin, a polyvinyl acetal resin, a polyvinyl butyral resin, an acrylic resin, silicone resin, an epoxy resin, a melamine resin, a polyurethane resin, a phenol resin, a polyvinyl alcohol resin, a cellulose resin, a polystyrene resin, a polyvinyl acetate resin, a polyvinyl chloride resin, and the like. Among these, the polyvinyl butyral resin is more preferable.

Moreover, the charge generation layer may further contain additives such as antioxidant and ultraviolet absorber. Specifically, the additives include a hindered phenol compound, a hindered amine compound, a sulfur compound, a phosphorus compound, a benzophenone compound, and the like.

The average film thickness of the charge generation layer is preferably 0.1 μm or more to 1 μm or less, more preferably 0.15 μm or more to 0.3 μm or less.

The charge generation layer can be formed by preparing an application liquid for the charge generation layer that contains the aforementioned materials and a solvent, forming an application film of the application liquid on a lower layer or the support, and drying the application liquid. The solvent used in the application liquid includes an alcohol-based solvent, a sulfoxide-based solvent, a ketone-based solvent, an ether-based solvent, an ester-based solvent, an aromatic hydrocarbon-based solvent, and the like.

<Charge Transfer Layer>

The charge transfer layer needs to contain a charge transfer substance and a resin.

Examples of the charge transfer substance include a polycyclic aromatic compound, a heterocyclic compound, a hydrazone compound, a styryl compound, an enamine compound, a benzidine compound, a triarylamine compound, resins including groups derived from these substances, and the like. Among these, the triarylamine compound and the benzidine compound are preferable.

The content of the charge transfer substance in the charge transfer layer is preferably 25% or more to 70% or less by mass with respect to the total mass of the charge transfer layer, more preferably, 30% or more to 55% or less by mass.

The resin includes a polyester resin, a polycarbonate resin, an acrylic resin, a polystyrene resin, and the like. Among these, the polycarbonate resin and the polyester resin are preferable. A polyarylate resin is particularly preferable as the polyester resin.

The charge transfer layer preferably has an ionization potential close to that of the charge generation layer from a viewpoint of smoothly transferring the photocarrier generated in the charge generation layer to the charge transfer layer. Particularly, when titanyl phthalocyanine or hydroxygallium phthalocyanine is used as the charge generation substance, the ionization potential of the charge transfer layer is preferably 5.2 eV or more to 5.5 eV or less, more preferably 5.3 eV or more to 5.4 eV or less. When the ionization potential is 5.2 eV or more to 5.5 eV or less, a trap is less likely to be generated at an interface of the charge generation layer and the charge transfer layer and the residual potential is reduced. When the ionization potential is less than 5.2 eV, a memory phenomenon becomes poorer in some cases. When the ionization potential is more than 5.5 eV, the residual potential increases in some cases.

Moreover, the charge transfer layer preferably has high mobility from a viewpoint of allowing the generated photocarrier to swiftly move in the charge transfer layer. Accordingly, the content ratio (mass ratio) between the charge transfer substance and the resin is preferably 6:10 to 20:10, more preferably 8:10 to 12:10. When the content ratio (mass ratio) between the charge transfer substance and the resin is 8:10 to 12:10, a trap is less likely to be generated in the bulk of the charge transfer layer and the residual potential is reduced. If the content ratio of the charge transfer substance is increased from that described above, the durability and the manufacturing stability of the photosensitive member may decrease.

Moreover, the charge transfer layer may contain additives such as antioxidant, ultraviolet absorber, plasticizer, leveling agent, slip imparting agent, and wear resistance improving agent. Specifically, the additives include a hindered phenol compound, a hindered amine compound, a sulfur compound, a phosphorus compound, a benzophenone compound, a siloxane-modified resin, a silicone oil, a fluororesin particle, a polystyrene resin particle, a polyethylene resin particle, a silica particle, an alumina particle, a boron nitride particle, and the like.

The average film thickness of the charge transfer layer is preferably 5 μm or more to 50 μm or less, more preferably 10 μm or more to 23 μm or less, particularly preferably 14 μm or more to 20 μm or less.

The charge transfer layer can be formed by preparing an application liquid for the charge transfer layer that contains the aforementioned materials and a solvent, forming an application film of the application liquid on a lower layer, and drying the application liquid. The solvent used in the application liquid includes an alcohol-based solvent, a ketone-based solvent, an ether-based solvent, an ester-based solvent, an aromatic hydrocarbon-based solvent, and the like. Among these solvents, the ether-based solvent or the aromatic hydrocarbon-based solvent is preferable.

<Protection Layer>

In the present invention, a protection layer may be provided on the photosensitive layer. Providing the protection layer can improve durability.

The protection layer preferably contains a resin and an electrically-conductive particle and/or a charge transfer substance.

The electrically-conductive particle includes particles of metal oxides such as titanium oxide, zinc oxide, tin oxide, and indium oxide.

The charge transfer substance includes a polycyclic aromatic compound, a heterocyclic compound, a hydrazone compound, a styryl compound, an enamine compound, a benzidine compound, a triarylamine compound, resins including groups derived from these substances, and the like. Among these, the triarylamine compound and the benzidine compound are preferable.

The resin includes a polyester resin, an acrylic resin, a phenoxy resin, a polycarbonate resin, a polystyrene resin, a phenol resin, a melamine resin, an epoxy resin, and the like. Among these, the polycarbonate resin, the polyester resin, and the acrylic resin are preferable.

Moreover, the protection layer may be formed as a cured film by polymerizing a composition containing a monomer with a polymerizable functional group. A polymerization reaction in this case includes a thermal polymerization reaction, a photopolymerization reaction, a radiation-induced polymerization reaction, and the like. The polymerizable functional group included in the monomer with the polymerizable functional group includes an acryloyl group, a methacryloyl group, and the like. A material with a charge transfer function can be used as the monomer with the polymerizable functional group.

The protection layer may contain additives such as antioxidant, ultraviolet absorber, plasticizer, leveling agent, slip imparting agent, and wear resistance improving agent. Specifically, the additives include a hindered phenol compound, a hindered amine compound, a sulfur compound, a phosphorus compound, a benzophenone compound, a siloxane-modified resin, a silicone oil, a fluororesin particle, a polystyrene resin particle, a polyethylene resin particle, a silica particle, an alumina particle, a boron nitride particle, and the like.

The average film thickness of the protection layer is preferably 0.5 μm or more to 10 μm or less, preferably 1 μm or more to 7 μm or less.

The protection layer can be formed by preparing an application liquid for the protection layer that contains the aforementioned materials and a solvent, forming an application film of the application liquid on a lower layer, and drying and/or curing the application liquid. The solvent used in the application liquid includes an alcohol-based solvent, a ketone-based solvent, an ether-based solvent, a sulfoxide-based solvent, an ester-based solvent, and an aromatic hydrocarbon-based solvent.

<Configuration Example of Layers in Electrophotographic Photosensitive Member Satisfying $I_{1/2}$≤0.170 μJ/Cm$^2$, AR≤0.370, and $LR_i$≤780 V·Cm$^2$/μJ>

In order for the electrophotographic photosensitive member to satisfy $I_{1/2}$≤0.170 μJ/cm$^2$, AR≤0.370, and $LR_i$≤780V·cm$^2$/μJ, the layers of the electrophotographic photosensitive member preferably have the following configuration. Specifically, the electrophotographic photosensitive member preferably includes the charge generation layer including the hydroxygallium phthalocyanine crystal that is described in the example of Japanese Patent Application Laid-Open No. 2018-189692 and that contains 0.4% or more to 3.0% or less by mass of the compound with the structure illustrated in the aforementioned formula (A1) in the crystal or the titanyl phthalocyanine crystal that is described in Japanese Patent Application Laid-Open No. 2000-137340 and that has a strong peak at a Bragg angle 2θ of 27.2°±0.3° in CuKα characteristic X-ray diffraction. Out of these, the electrophotographic photosensitive member preferably includes the charge generation layer including the hydroxygallium phthalocyanine crystal that is described in the example of Japanese Patent Application Laid-Open No. 2018-189692 and that contains 0.4% or more to 3.0% or less by mass of the compound with the structure illustrated in the aforementioned formula (A1) in the crystal. Moreover, the electrophotographic photosensitive member preferably includes the charge transfer layer with the ionization potential of 5.2 eV or more to 5.5 eV or less, more preferably includes the charge transfer layer with the ionization potential of 5.3 eV or more to 5.4 eV or less.

Moreover, the electrophotographic photosensitive member preferably includes both of the aforementioned charge generation layer and charge transfer layer.

This is based on a viewpoint of allowing the photocarrier generated in the pigment dispersed in the resin to smoothly flow to the charge transfer layer by combining the charge generation layer that prevents an interface between the pigment and the resin from becoming a charge trap and the charge transfer layer that hinders generation of an interface trap between the charge generation layer and the charge transfer layer.

An example of a preferable configuration includes an electrophotographic photosensitive member including the hydroxygallium phthalocyanine crystal that is described in the example of Japanese Patent Application Laid-Open No. 2018-189692 and that contains 0.4% or more to 3.0% or less by mass of the compound with the structure illustrated in the aforementioned formula (A1) in the crystal and the charge transfer layer that has an ionization potential of 5.3 eV or more to 5.4 eV or less.

However, the configuration example described above is merely an example and the electrophotographic photosensitive member of the present invention is not limited to the aforementioned configuration example as long as it satisfies $I_{1/2}$≤0.170 μJ/cm$^2$, AR≤0.370, and $LR_i$≤780V·cm$^2$/μJ.

<Configuration Example of Layers in Electrophotographic Photosensitive Member Satisfying $I_{1/2}$≤0.170 μJ/Cm$^2$, AR≤0.500, and $LR_i$≤520 V·Cm$^2$/μJ>

Moreover, in order for the electrophotographic photosensitive member to satisfy $I_{1/2}$≤0.170 μJ/cm$^2$, AR≤0.500, and $LR_i$≤520V·cm$^2$/μJ, the layers of the electrophotographic photosensitive member preferably have the following configuration. The electrophotographic photosensitive member preferably includes the undercoat layer including the titanium oxide particle whose surface is subjected to the silane treatment and whose crystal structure is the rutile type or the anatase type. Among such under coat layers, the electrophotographic photosensitive member preferably includes the undercoat layer including the rutile type titanium oxide whose rutile percentage is 90% or more and whose surface is subjected to the silane treatment by using at least one type of compound selected from the group consisting of vinyltrimethoxysilane, vinyltriethoxysilane, and vinylmethyldimethoxysilane, the undercoat layer being a layer in which the volume ratio between the titanium oxide particle and the binding resin (the volume of the titanium oxide particle to the volume of the binding resin) is 0.2 or more. Moreover, the electrophotographic photosensitive member preferably includes the charge generation layer including the hydroxygallium phthalocyanine crystal that is described in the example of Japanese Patent Application Laid-Open No. 2018-189692 and that contains 0.4% or more to 3.0% or less by mass of the compound with the structure illustrated in the aforementioned formula (A1) in the crystal or the titanyl phthalocyanine crystal that is described in Japanese Patent Application Laid-Open No. 2000-137340 and that has a strong peak at a Bragg angle 2θ of 27.2° 0.3° in CuKα characteristic X-ray diffraction. Out of these, the electrophotographic photosensitive member preferably includes the charge generation layer including the hydroxygallium phthalocyanine crystal that is described in the example of Japanese Patent Application Laid-Open No. 2018-189692 and that contains 0.4% or more to 3.0% or less by mass of the compound with the structure illustrated in the aforementioned formula (A1) in the crystal. Moreover, the electrophotographic photosensitive member preferably includes the charge transfer layer with the ionization potential of 5.2 eV or more to 5.5 eV or less, more preferably includes the charge transfer layer with the ionization potential of 5.3 eV or more to 5.4 eV or less.

Moreover, the electrophotographic photosensitive member particularly preferably includes all of the undercoat layer, the charge generation layer, and the charge transfer layer described above.

This is based on a viewpoint of allowing one of negative and positive photocarriers generated in a pigment dispersed in a resin to smoothly flow to the charge transfer layer and also allowing the photocarrier of the opposite polarity to smoothly flow to the support by combining the undercoat layer that allows the photocarrier generated in the charge generation layer to smoothly flow toward the support, the charge generation layer that prevents the interface between the pigment and the resin from becoming a charge trap, and the charge transfer layer that hinders generation of the interface trap between the charge generation layer and the charge transfer layer.

As an example of the preferable configuration, it is possible to give the electrophotographic photosensitive member including: the undercoat layer including the rutile type titanium oxide particle whose rutile percentage is 90% or more and whose surface is subjected to the silane treatment by using at least one type of compound selected from the group consisting of vinyltrimethoxysilane, vinyltriethoxysilane, and vinylmethyldimethoxysilane, the undercoat layer being a layer in which the volume ratio between the titanium oxide particle and the binding resin (the volume of the titanium oxide particle to the volume of the binding resin) is 0.2 or more; the charge generation layer containing the hydroxygallium phthalocyanine crystal that is described in the example of Japanese Patent Application Laid-Open No. 2018-189692 and that contains 0.4% or more to 3.0% or less by mass of the compound with the structure illustrated in the aforementioned formula (A1) in the crystal; and the charge transfer layer with the ionization potential of 5.3 eV or more to 5.4 eV or less. However, the aforementioned configuration example is merely an example and the electrophotographic photosensitive member of the present invention is not limited to the aforementioned configuration as long as it satisfies $I_{1/2}$≤0.170 μJ/cm$^2$, AR≤0.500, and $LR_i$≤520 V·cm$^2$/μJ.

[Process Cartridge and Electrophotographic Apparatus]

Figure 8:
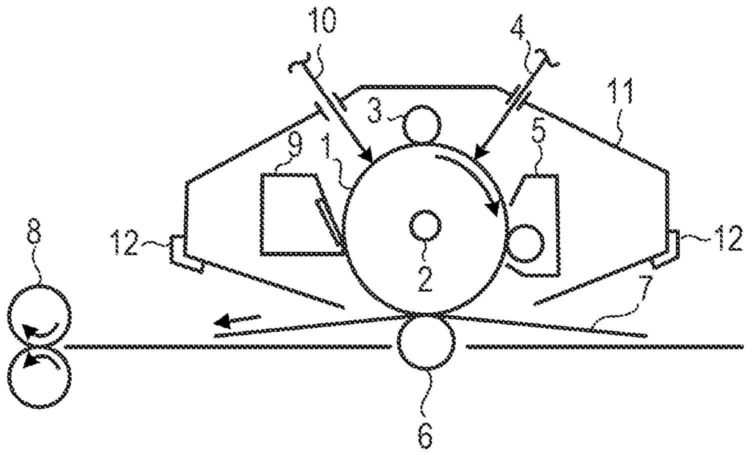
FIG. 8 is a diagram illustrating an example of a schematic configuration of an electrophotographic apparatus including a process cartridge provided with the electrophotographic photosensitive member and a charging unit.
Figures 9A, 9B, 9C, 9D, 9E:
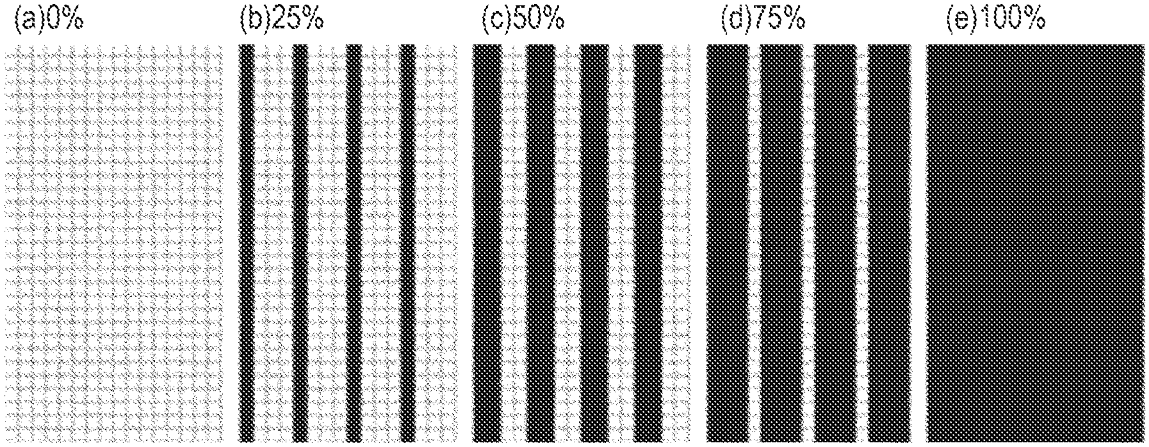
FIGS. 9A, 9B, 9C, 9D, and 9E are diagrams each illustrating an example of a gradation dither pattern used for evaluation in the present invention.

FIG. 8 illustrates an example of a schematic configuration of an electrophotographic apparatus including a process cartridge provided with the electrophotographic photosensitive member. In FIG. 8, reference sign 1 denotes the cylindrical (drum-shaped) electrophotographic photosensitive member and the electrophotographic photosensitive member 1 is rotationally driven at predetermined circumferential speed (process speed) in the direction of the arrow about a shaft 2.

The surface of the electrophotographic photosensitive member 1 is charged to a predetermined positive or negative potential by a charging unit 3 in a rotation process. Then, the surface of the charged electrophotographic photosensitive member 1 is irradiated with an image exposure light 4 from an exposure unit (not illustrated) to form an electrostatic latent image corresponding to target image information. The image exposure light 4 is, for example, light that is outputted from an exposure unit such as a slit exposure or laser beam scanning exposure and that is intensity-modulated according to a time-series electric digital image signal of the target image information.

The electrostatic latent image formed on the surface of the electrophotographic photosensitive member 1 is developed (subjected to normal development or reversal development) by using a toner contained in a development unit 5 and a toner image is formed on the surface of the electrophotographic photosensitive member 1. A transfer unit 6 transfers the toner image formed on the surface of the electrophotographic photosensitive member 1 to a transfer material 7. In this case, a bias voltage having a polarity opposite to that of a charge held by the toner is applied from a bias power source (not illustrated) to the transfer unit 6. Moreover, when the transfer material 7 is paper, the transfer material 7 is taken out from a paper feeding unit (not illustrated) and is fed to a portion between the electrophotographic photosensitive member 1 and the transfer unit 6 in synchronization with the rotation of the electrophotographic photosensitive member 1.

The transfer material 7 to which the toner image is transferred from the electrophotographic photosensitive member 1 is separated from the surface of the electrophotographic photosensitive member 1, then conveyed to a fusing unit 8, is subjected to a treatment of fusing the toner image, and is printed out to the outside of the electrophotographic apparatus as an image formed product (print, copy). A cleaning unit 9 cleans the surface of the electrophotographic photosensitive member 1 after the transfer of the toner image to the transfer material 7, by removing attached objects such as remaining toner (transfer residual toner) and the like. The transfer residual toner can be directly removed in a development device or the like by using a recently-developed cleaner-less system. Moreover, the surface of the electrophotographic photosensitive member 1 is subjected to a charge removal treatment by using pre-exposure light 10 from a pre-exposure unit (not illustrated) and is then repeatedly used for image formation. Note that, when the charging unit 3 is a contact charging unit using a charging roller or the like, the pre-exposure unit is not necessarily required. In the present invention, multiple components among the aforementioned components such as the electrophotographic photosensitive member 1, the charging unit 3, the development unit 5, and the cleaning unit 9 can be housed in a container to be integrally supported and form the process cartridge. Moreover, the process cartridge can be configured to be attachable to and detachable from a main body of the electrophotographic apparatus. For example, at least one selected from the group consisting of the charging unit 3, the development unit 5, and the cleaning unit 9 can be integrally supported together with the electrophotographic photosensitive member 1 to form a cartridge. Moreover, the process cartridge 11 may be attachable to and detachable from the electrophotographic apparatus main body by using a guide unit 12 such as a rail in the electrophotographic apparatus main body. The image exposure light 4 may be light reflected on an original or light transmitting an original when the electrophotographic apparatus is a copier or a printer. Alternatively, the configuration may be such that an original is read by a sensor to be converted to a signal and the image exposure light 4 is light emitted by scanning of a laser beam, drive of an LED array, drive of a liquid crystal shutter array, or the like that is performed according to the signal.

The electrophotographic photosensitive member 1 of the present invention can be widely applied to fields of electrophotographic application such as a laser beam printer, a CRT printer, an LED printer, a facsimile, a liquid crystal printer, and laser plate making.

EXAMPLES

The present invention is described in further detail below by using Examples and Comparative Examples. The present invention is not limited by Examples described below as long as the gist of the present invention is not exceeded. Note that, in the following description of Examples, “part” is based on mass unless otherwise noted.

The film thickness of each of the layers except for the charge generation layer in the electrophotographic photosensitive members of Examples and Comparative Examples was obtained by a method using an eddy-current film thickness gauge (Fischerscope (trademark), manufactured by Fisher Instruments) or a method of performing specific gravity conversion based on a mass per unit area. The film thickness of the charge generation layer was obtained as follows. Specifically, a spectrodensitometer (product name: X-Rite504/508, manufactured by X-Rite Inc.) was pushed against the surface of the photosensitive member to measure a Macbeth density value. The film thickness was calculated from the measured Macbeth density value by using a calibration curve obtained in advance from a Macbeth density value and a film thickness value measured by cross-sectional SEM image observation.

<Preparation of Application Liquid for Electrically-Conductive Layer

[Example of Manufacturing Titanium Oxide Particle]

A titanium niobium sulfuric acid solution containing 33.7 parts of titanium in terms of $TiO_2$ and 2.9 parts of niobium in terms of $Nb_2O_5$ was prepared as a base substance by using anatase type titanium oxide with an average primary particle size of 200 nm. Then, 100 parts of the base substance was dispersed in pure water to produce 1000 parts of a suspension liquid and was heated to 60° C. The titanium niobium sulfuric acid solution and a 10 mol/L sodium hydroxide were simultaneously added dropwise in three hours such that pH of the suspension liquid became 2 to 3. After the dropwise adding of the whole amount, pH was adjusted to be close to neutral and a polyacrylamide-based flocculant was added to cause solid contents to settle. The solution was subjected to removal of supernatant and was filtered, cleaned, and dried at 110° C. to obtain an intermediate product containing 0.1% by weight of an organic substance derived from the flocculant in terms of C. The intermediate product was baked for one hour at 750° C. in nitrogen and then baked at 450° C. in air to fabricate a titanium oxide particle. The average particle size (average primary particle size) of the obtained particle was measured by the aforementioned particle size measurement method using the scanning electron microscope and was 220 nm.

[Preparation of Application Liquid 1 for Electrically-Conductive Layer]

A solution was obtained by dissolving 50 parts of a phenol resin (monomer/oligomer of a phenol resin) (product name: Plyofen J-325, manufactured by DIC corporation, resin solid content: 60%, density after curing: 1.3 g/cm$^2$) that is a binding material into 35 parts of 1-methoxy-2-propanol that is a solvent.

Into this solution, 75 parts of the titanium oxide particle obtained in the example of manufacturing the titanium oxide particle was added to produce a dispersed medium. The dispersed medium was put into a vertical sand mill using 120 parts of a glass bead with an average particle size of 1.0 mm and was subjected to a dispersion process for four hours under the conditions of dispersed liquid temperature of 23±3° C. and rotation speed of 1,500 rpm (circumferential speed 5.5 m/s) to obtain a dispersed liquid. The glass bead was removed from the dispersed liquid by using a mesh. Into the dispersed liquid from which the glass bead was removed, 0.01 parts of a silicone oil (product name: SH28 PAINT ADDITIVE, manufactured by Dow Corning Toray Co., Ltd.) and 8 parts of a silicone resin particle (product name: KMP-590, manufactured by Shin-Etsu Chemical Co., Ltd., average particle size: 2 μm, density: 1.3 g/cm$^3$) were added, respectively as a leveling agent and a surface roughness imparting agent and the dispersed liquid was agitated. The dispersed liquid was pressure-filtered by using a PTFE filter paper (product name: PF060, Advantec Toyo Kaisha, Ltd.) to prepare an application liquid 1 for the electrically-conductive layer.

[Preparation of Application Liquid 2 for Electrically-Conductive Layer]

An application liquid 2 for the electrically-conductive layer was prepared by putting 60 parts of a barium sulfate particle coated with tin oxide (product name: Passstran PC1, manufactured by Mitsui Mining & Smelting Co., Ltd.), 15 parts of a titanium oxide particle (product name: TITANIX JR, manufactured by TAYCA Co., Ltd.), 43 parts of a resol type phenol resin (product name: PHENOLITE J-325, manufactured by DIC corporation, solid content: 70% by mass), 0.015 parts of a silicone oil (product name: SH28PA, manufactured by Dow Corning Toray Co., Ltd.), 3.6 parts of a silicone resin particle (product name: Tospearl 120, manufactured by Momentive Performance Materials Japan LLC), 50 parts of 2-methoxy-1-propanol, and 50 parts of methanol into a ball mill and performing a dispersion process for 20 hours.

[Preparation of Application Liquid 3 for Electrically-Conductive Layer]

First, 100 parts of a zinc oxide particle (average primary particle size: 50 nm, specific surface area: 19 $m^2/g$, powder resistance: $1.0\times10^7$ Ω·cm, manufactured by TAYCA Co., Ltd.) and 500 parts of toluene were mixed while being agitated. Into this mixture, 0.75 parts of N-2-(aminoethyl)-3-aminopropylmethyldimethoxysilane (product name: KBM-602, manufactured by Shin-Etsu Chemical Co., Ltd.) was added as a surface treatment agent and was mixed while being agitated for two hours. Then, toluene was distilled away by depressurization and the mixture was dried for three hours at 120° C. to obtain a zinc oxide particle subjected to a surface treatment.

Next, 100 parts of a titanium oxide particle (product name: JR-405, average primary particle size: 210 nm, manufactured by TAYCA Co., Ltd.) was mixed and agitated with 500 parts of toluene, 0.75 parts of N-2-(aminoethyl)-3-aminopropylmethyldimethoxysilane was added, and this mixture was agitated for two hours. Thereafter, toluene was distilled away by depressurization and the mixture was dried for three hours at 120° C. to obtain a titanium oxide particle subjected to a surface treatment.

Subsequently, 100 parts of the aforementioned zinc oxide particle subjected to the surface treatment, 12 parts of the aforementioned titanium oxide particle subjected to the surface treatment, 30 parts of a blocked isocyanate compound (product name: Sumidur 3175, solid content: 75% by mass, manufactured by Sumitomo Bayer Urethane Co., Ltd.) illustrated by the following formula (A2), (A2)

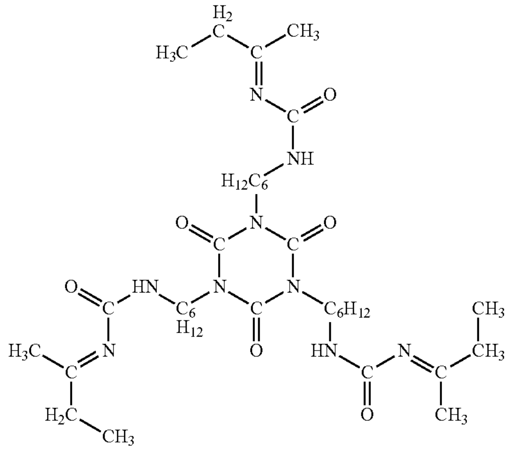

15 parts of a polyvinyl butyral resin (product name: S-LEC BM-1, manufactured by Sekisui Chemical Co., Ltd.), and 1 part of 2,3,4-trihydroxybenzophenone (manufactured by Tokyo Chemical Industry Co., Ltd.) were added to a mixed solvent of 70 parts of methyl ethyl ketone and 70 parts of cyclohexanone to prepare a dispersed liquid.

The dispersed liquid was subjected to a dispersion process in a vertical sand mill for three hours in an atmosphere of 23° C. at rotation speed of 1,500 rpm by using a glass bead with an average particle size of 1.0 mm. After the dispersion process, the glass bead was removed from the obtained dispersed liquid by using a mesh and 7 parts of a cross-linked polymethylmethacrylate particle (product name: SSX-103, average particle size: 3 μm, Sekisui Chemical Co., Ltd.) and 0.01 parts of a silicone oil (product name: SH28PA, manufactured by Dow Corning Toray Co., Ltd.) were added and the dispersed liquid was agitated to prepare an application liquid 3 for the electrically-conductive layer.

[Preparation of Application Liquid 4 for Electrically-Conductive Layer]

First, 100 parts of zinc oxide (average primary particle size: 70 nm, specific surface area: 15 $m^2/g$, manufactured by TAYCA Co., Ltd.) was mixed with 500 parts of toluene while being agitated. Into this mixture, 1.25 parts of a silane coupling agent (product name: KBM-603, manufactured by Shin-Etsu Chemical Co., Ltd.) was added as a surface treatment agent and was mixed while being agitated for two hours. Thereafter, toluene was distilled away by depressurization and the mixture was dried for two hours at 150° C. to obtain a zinc oxide particle subjected to a surface treatment.

Then, 60 parts of the aforementioned zinc oxide particle subjected to the surface treatment, 13.5 parts of a blocked isocyanate compound (product name: Sumidur 3175, solid content: 75% by mass, manufactured by Sumitomo Bayer Urethane Co., Ltd.) illustrated by the aforementioned formula (A2), 15 parts of a polyvinyl butyral resin (product name: S-LEC BM-1, manufactured by Sekisui Chemical Co., Ltd.) were added to 85 parts of methyl ethyl ketone to prepare a dispersed liquid.

The dispersed liquid was subjected to a dispersion process in a vertical sand mill for two hours in an atmosphere of 23° C. at rotation speed of 1,500 rpm by using a glass bead with an average particle size of 1.0 mm. After the dispersion process, the glass bead was removed from the obtained dispersed liquid by using a mesh and 0.005 parts of dioctyltin dilaurate and 3.4 parts of a silicone resin particle (product name: Tospearl 130, manufactured by GE Toshiba Silicones Co., Ltd.) were added as catalyst to obtain an application liquid 4 for the electrically-conductive layer.

[Preparation of Application Liquid 5 for Electrically-Conductive Layer]

First, 50 parts of a titanium oxide powder coated with tin oxide containing 10% of antimony oxide, 25 parts of a resol type phenol resin, 20 parts of methyl cellosolve, 5 parts of methanol, and 0.002 parts of a silicone oil (copolymer of polydimethylsiloxane and polyoxyalkylene, average molecular weight: 3,000) were subjected to a dispersion process in a vertical sand mill for two hours in an atmosphere of 23° C. at rotation speed of 1,500 rpm by using a glass bead with an average particle size of 1.0 mm. After the dispersion process, the glass bead was removed from the obtained dispersed liquid by using a mesh and an application liquid 5 for the electrically-conductive layer was prepared.

<Preparation of Application Liquid for Undercoat Layer>

[Preparation of Application Liquid 1 for Undercoat Layer]

First, 100 parts of a rutile type titanium oxide particle (product name: MT-600B, average primary particle size: 50 nm, manufactured by TAYCA Co., Ltd.) and 500 parts of toluene were mixed and agitated and 5.0 parts of vinyltrimethoxysilane (product name: KBM-1003, manufactured by Shin-Etsu Chemical Co., Ltd.) was added and the mixture was agitated for eight hours. Thereafter, toluene was distilled away by depressurization and the mixture was dried for three hours at 120° C. to obtain a rutile type titanium oxide particle subjected to a surface treatment with vinyltrimethoxysilane.

Next, 18 parts of the aforementioned rutile type titanium oxide particle subjected to the surface treatment with vinyltrimethoxysilane, 4.5 parts of N-methoxymethylated nylon 6 (product name: Toresin EF-30T, manufactured by Nagase ChemteX Corporation), and 1.5 parts of a copolymer nylon resin (product name: Amilan (trademark) CM8000, manufactured by Toray Industries, Inc.) were added to a mixed solvent of 90 parts of methanol and 60 parts of 1-butanol to prepare a dispersed liquid. The dispersed liquid was subjected to a dispersion process in a vertical sand mill for five hours by using a glass bead with a diameter of 1.0 mm to prepare an application liquid 1 for the undercoat layer.

[Preparation of Application Liquid 2 for Undercoat Layer]

A solution obtained by dissolving (performing heating dissolution at 65° C.) 25 parts of N-methoxymethylated nylon 6 (product name: Toresin EF-30T, manufactured by Nagase ChemteX Corporation) into 480 parts of a methanol/n-butanol=2/1 mixed solution was cooled. Thereafter, the solution was filtered by using a membrane filter (trade name: FP-022, pore diameter: 0.22 μm, manufactured by Sumitomo Electric Industries, Ltd.) to prepare an application liquid 2 for the undercoat layer.

[Preparation of Application Liquid 3 for Undercoat Layer]

First, 1 part by mass of a compound illustrated by the following formula (A3), (A3)

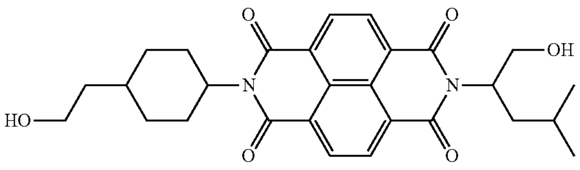

0.2 parts by mass of a polyvinyl butyral resin (product name: S-LEC KS5, manufactured by Sekisui Chemical Co., Ltd.), and 0.0005 parts by mass of dioctyltin laurate were dissolved into a mixed solvent of 15 parts by mass of methoxypropanol and 15 parts by mass of tetrahydrofuran. A blocked isocyanate resin (product name: DURANATE SBN-70D, manufactured by Asahi Kasei Corporation) corresponding to 1.3 parts by mass of solid content was added to this solution and an application liquid 3 for the undercoat layer was prepared.

[Preparation of Application Liquid 4 for Undercoat Layer]

First, 1 part by mass of a compound illustrated by the following formula (A4), (A4)

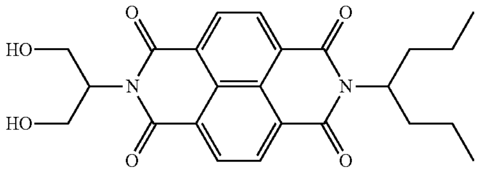

0.2 parts by mass of a polyvinyl butyral resin (S-LEC KS5, manufactured by Sekisui Chemical Co., Ltd.), and 0.0005 parts by mass of dioctyltin laurate were dissolved into a mixed solvent of 15 parts by mass of methoxypropanol and 15 parts by mass of tetrahydrofuran. A blocked isocyanate resin (product name: DURANATE SBN-70D, manufactured by Asahi Kasei Corporation) corresponding to 1.3 parts by mass of solid content was added to this solution and an application liquid 4 for the undercoat layer was prepared.

[Preparation of Application Liquid 5 for Undercoat Layer]

A solution obtained by dissolving (performing heating dissolution at 65° C.) 5 parts of 6-66-610-12 quaternary system polyamide copolymer into 95 parts of methanol/n-butanol=14/5 mixed solution was cooled. Thereafter, the solution was filtered by using a membrane filter (trade name: FP-022, pore diameter: 0.22 μm, manufactured by Sumitomo Electric Industries, Ltd.) to prepare an application liquid 5 for the undercoat layer.

[Preparation of Application Liquid 6 for Undercoat Layer]

An application liquid 6 for the undercoat layer was prepared by dissolving 30 parts of a titanium chelate compound (product name: TC-750, manufactured by Matsumoto Pharmaceutical Manufacture Co.) and 17 parts of a silane coupling agent (product name: KBM-603, manufactured by Shin-Etsu Chemical Co., Ltd.) into 117 parts of 2-propanol.

<Preparation of Application Liquid for Charge Generation Layer>

Synthesis Example 1

In an atmosphere of nitrogen flow, 5.46 parts of orthophthalonitrile and 45 parts of α-chloronaphthalene were loaded into a reaction kettle, then heated to temperature of 30° C., and maintained at this temperature. Next, 3.75 parts of gallium trichloride was loaded into the reaction kettle at this temperature (30° C.). A water concentration of a mixed liquid at the moment of loading was 150 ppm. Thereafter, the temperature was increased to 200° C. Next, these substances were reacted for 4.5 hours at 200° C. in the atmosphere of nitrogen flow and then cooled and a product was filtered when the temperature reached 150° C. The obtained residue was subjected to dispersion cleaning for two hours at temperature of 140° C. by using N,N-dimethylformamide and then filtered. The obtained residue was cleaned with methanol and then dried and a chloro-gallium phthalocyanine pigment was obtained at a yield of 71%.

Synthesis Example 2

First, 4.65 parts of the aforementioned chloro-gallium phthalocyanine pigment obtained in the synthesis example 1 was dissolved into 139.5 parts of concentrated sulfuric acid at 10° C. and the dissolved liquid was added dropwise into 620 parts of ice water under agitation to be reprecipitated and was filtered under reduced pressure by using a filter press. No. 5C (manufactured by Advantec Co. Ltd.) was used as the filter in this case. The obtained wet cake (residue) was subjected to dispersion cleaning with 2% ammonia water for 20 minutes and then filtered by using a filter press. Next, the obtained wet cake (residue) was subjected to dispersion cleaning with ion-exchanged water and then repeatedly filtered three times by using a filter press. Lastly, freeze drying was performed and a hydroxy gallium phthalocyanine pigment (aqueous hydroxy gallium phthalocyanine pigment) with a solid content of 23% was obtained at a yield of 97%.

Synthesis Example 3

First, 6.6 kg of the aforementioned hydroxy gallium phthalocyanine pigment obtained in the synthesis example 2 was dried as follows by using Hyper Dry dryer (product name: HD-06, frequency (oscillating frequency): 2,455 MHz±15 MHz, manufactured by Biocon Japan Ltd.).

The aforementioned hydroxy gallium phthalocyanine pigment taken out from the filter press was placed as it was on a dedicated circular plastic tray in a solid state (water-containing cake with a thickness of 4 cm or less) and the dryer was set such that far infrared radiation was off and temperature of an inner wall of the dryer was 50° C. Then, in microwave irradiation, a vacuum pump and a leak valve were adjusted to adjust a degree of vacuum to 4.0 to 10.0 kPa.

As a first step, the hydroxy gallium phthalocyanine pigment was irradiated with a microwave of 4.8 kW for 50 minutes. Then, the microwave was temporarily turned off and the leak valve was temporarily closed to achieve high vacuum of 2 kPa or less. The solid content of the hydroxy gallium phthalocyanine pigment at this point was 88%. As a second step, the leak valve was adjusted to adjust the degree of vacuum (pressure in the dryer) to a value within the aforementioned setting value (4.0 to 10.0 kPa). Thereafter, the hydroxy gallium phthalocyanine pigment was irradiated with a microwave of 1.2 kW for five minutes. The microwave was temporarily turned off and the leak valve was temporarily closed to achieve high vacuum of 2 kPa or less again. This second step was repeated one more time (specifically, was performed total of two times). The solid content of the hydroxy gallium phthalocyanine pigment at this point was 98%. As a third step, microwave irradiation was performed as in the second step except for changing the output of the microwave from 1.2 kW in the second step to 0.8 kW. This third step was repeated one more time (specifically, was performed total of two times). Moreover, as a fourth step, the leak valve was adjusted to cause the degree of vacuum to return to a value within the aforementioned setting value (4.0 to 10.0 kPa). Thereafter, the hydroxy gallium phthalocyanine pigment was irradiated with a microwave of 0.4 kW for three minutes. The microwave was temporarily turned off and the leak valve was temporarily closed to achieve high vacuum of 2 kPa or less again. This fourth step was repeated seven more times (specifically, was performed total of eight times). Thus, 1.52 kg of hydroxy gallium phthalocyanine pigment (crystal) with a water concentration of 1% or less was obtained in total of three hours.

Synthesis Example 4

First, 5.0 g of o-phthalodinitrile and 2.0 g of titanium tetrachloride were heated and agitated in 100 g of α-chloronaphthalene for three hours at 200° C. and then cooled to 50° C. A crystal thus precipitated was filtered and a paste of dichlorotitanium phthalocyanine was obtained. Next, this paste was agitated and cleaned in 100 mL of N,N-dimethylformamide heated to 100° C., then repeatedly cleaned with 100 mL of methanol at 60° C. twice, and filtered. The obtained paste was further agitated in 100 mL of deionized water for one hour at 80° C. and filtered and 4.3 g of a blue titanyl phthalocyanine pigment was obtained.

Milling Example 1

A milling process was performed on 1 part of the hydroxy gallium phthalocyanine pigment obtained in the synthesis example 3, 9 parts of N-methylformamide (product code: F0059, manufactured by Tokyo Chemical Industry Co., Ltd.), and 15 parts of a glass bead with a diameter of 0.9 mm for 70 hours at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The milling process was performed under such a condition that the discs were rotated 400 times per minute. A liquid processed as described above was filtered with a filter (product number: N-NO. 125T, pore diameter: 133 μm, manufactured by NBC Meshtec Inc.) to remove the glass bead. Next, 30 parts of N-methylformamide was added to this liquid. Then, the liquid was filtered and a residue on a filtering device was sufficiently cleaned with tetrahydrofuran. Next, the cleaned residue was vacuum dried and 0.45 parts of a hydroxy gallium phthalocyanine pigment was obtained. The obtained pigment had strong peaks at Bragg angles 2θ of 7.4°±0.3° and 28.2°±0.3° in an X-ray diffraction spectrum using CuKα line. The content of the amid compound (N-methylformamide) illustrated by the aforementioned formula (A1) in the hydroxy gallium phthalocyanine crystal particle that was estimated by $^{1}$H-NMR measurement was 0.8% by mass with respect to the content of the hydroxy gallium phthalocyanine.

Milling Example 2

A milling process was performed on 0.5 parts of the titanyl phthalocyanine pigment obtained in the synthesis example 4, 10 parts of tetrahydrofuran, and 15 parts of a glass bead with a diameter of 0.9 mm for 48 hours at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The milling process was performed under such a condition that the discs were rotated 500 times per minute. A liquid processed as described above was filtered with a filter (product number: N-NO. 125T, pore diameter: 133 μm, manufactured by NBC Meshtec Inc.) to remove the glass bead. Next, 30 parts of tetrahydrofuran was added to this liquid. Then, the liquid was filtered and a residue on a filtering device was sufficiently cleaned with methanol and water. The cleaned residue was vacuum dried and 0.45 parts of a titanyl phthalocyanine pigment was obtained. The obtained pigment had a strong peak at a Bragg angle 2θ of 27.2°±0.3° in an X-ray diffraction spectrum using CuKα line.

Milling Example 3

A milling process was performed on 0.5 parts of the hydroxy gallium phthalocyanine pigment obtained in the synthesis example 3, 9.5 parts of N,N-dimethylformamide (product code: D0722, manufactured by Tokyo Chemical Industry Co., Ltd.), and 15 parts of a glass bead with a diameter of 0.9 mm for 100 hours at room temperature (23° C.), by using a ball mill. In this case, a standard bottle (product name: PS-6, manufactured by Hakuyo Glass Co., Ltd.) was used as a container and the process was performed under such a condition that the container was rotated 60 times per minute. A liquid processed as described above was filtered with a filter (product number: N-NO. 125T, pore diameter: 133 μm, manufactured by NBC Meshtec Inc.) to remove the glass bead. Next, 30 parts of N,N-dimethylformamide was added to this liquid. Then, the liquid was filtered and a residue on a filtering device was sufficiently cleaned with tetrahydrofuran. The cleaned residue was vacuum dried and 0.48 parts of a hydroxy gallium phthalocyanine pigment was obtained. The obtained pigment had peaks at Bragg angles 2θ of 7.4°±0.3° and 28.2°+0.3° in an X-ray diffraction spectrum using CuKα line.

[Preparation of Application Liquid 1 for Charge Generation Layer]

A dispersion process was performed on 20 parts of the hydroxy gallium phthalocyanine pigment obtained in the milling example 1, 10 parts of polyvinyl butyral (product name: S-LEC BX-1, manufactured by Sekisui Chemical Co., Ltd.), 190 parts of cyclohexanone, and 482 parts of a glass bead with a diameter of 0.9 mm for 4 hours at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The dispersion process was performed under such a condition that the discs were rotated 1,800 times per minute. After removal of the glass bead, 444 parts of cyclohexanone and 634 parts of ethyl acetate were added to the dispersed liquid and an application liquid 1 for the charge generation layer was prepared.

[Preparation of Application Liquid 2 for Charge Generation Layer]

A dispersion process was performed on 12 parts of the titanyl phthalocyanine pigment obtained in the milling example 2, 10 parts of polyvinyl butyral (product name: S-LEC BX-1, manufactured by Sekisui Chemical Co., Ltd.), 158 parts of cyclohexanone, and 402 parts of a glass bead with a diameter of 0.9 mm for 4 hours at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The dispersion process was performed under such a condition that the discs were rotated 1,800 times per minute. After removal of the glass bead, 396 parts of cyclohexanone and 527 parts of ethyl acetate were added to the dispersed liquid and an application liquid 2 for the charge generation layer was prepared.

[Preparation of Application Liquid 3 for Charge Generation Layer]

A dispersion process was performed on 20 parts of the hydroxy gallium phthalocyanine pigment obtained in the milling example 3, 10 parts of polyvinyl butyral (product name: S-LEC BX-1, manufactured by Sekisui Chemical Co., Ltd.), 190 parts of cyclohexanone, and 482 parts of a glass bead with a diameter of 0.9 mm for 4 hours at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The dispersion process was performed under such a condition that the discs were rotated 1,800 times per minute. After removal of the glass bead, 444 parts of cyclohexanone and 634 parts of ethyl acetate were added to the dispersed liquid and an application liquid 3 for the charge generation layer was prepared.

[Preparation of Application Liquid 4 for Charge Generation Layer]

A milling process was performed on 0.45 parts of polycarbonate (product name: Iupilon Z-200, manufactured by Mitsubishi Engineering-Plastics Corporation), 2.4 parts of the hydroxy gallium phthalocyanine pigment obtained in the milling example 3, 56 parts of tetrahydrofuran, and 300 parts of a stainless steel ball with a diameter of 3.2 mm for 24 hours at room temperature (23° C.), by using a standard bottle (product name: PS-6, manufactured by Hakuyo Glass Co., Ltd.), in a ball mill in which the container was rotated at a condition of 120 times per minute. After removal of the stainless steel ball, 2.25 parts of polycarbonate (product name: Iupilon Z-200, manufactured by Mitsubishi Engineering-Plastics Corporation) was dissolved into 46.1 parts of tetrahydrofuran and this dissolved liquid was added to the aforementioned hydroxy gallium phthalocyanine slurry. Then, a dispersion process was performed on 300 parts of this slurry and 450 parts of a glass bead with a diameter of 0.9 mm for 10 minutes at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The dispersion process was performed under such a condition that the discs were rotated 1,800 times per minute. The glass bead was removed from the dispersed liquid and an application liquid 4 for the charge generation layer was prepared.

[Preparation of Application Liquid 5 for Charge Generation Layer]

A dispersion process was performed on 10 parts of a trisazo pigment expressed by the following formula (CGM-1), (CGM-1)

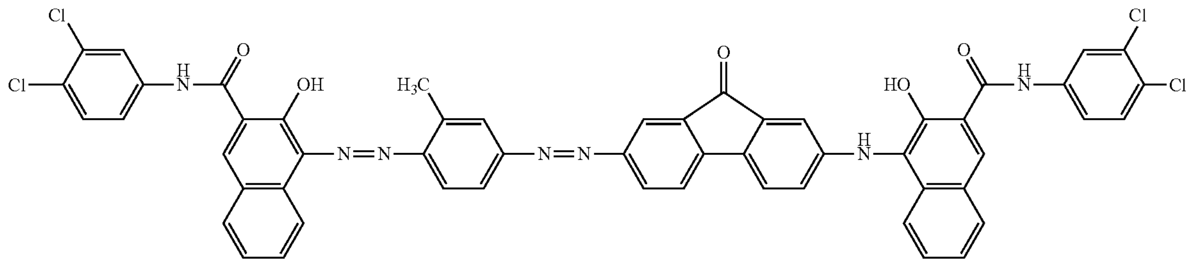

5 parts of a phenoxy resin (product name: PKHH, manufactured by Union Carbide Corporation), 5 parts of a polyvinyl butyral resin (product name: S-LEC BX-1, manufactured by Sekisui Chemical Co., Ltd.), 100 parts of cyclohexanone, and 200 parts of a glass bead with a diameter of 0.9 mm for 24 hours at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The dispersion process was performed under such a condition that the discs were rotated 1,800 times per minute. After removal of the glass bead, 200 parts of 1,4-dioxane was added to the dispersed liquid and an application liquid 5 for the charge generation layer was prepared.

[Preparation of Application Liquid 6 for Charge Generation Layer]

A dispersion process was performed on 9 parts of titanyl phthalocyanine having strong peaks at Bragg angles 2θ of 9.6°±0.2°, 24.0°±0.2°, and 27.2°+0.2° in an X-ray diffraction spectrum using CuKα line, 11 parts of polyvinyl butyral (product name: BX-55, manufactured by Sekisui Chemical Co., Ltd.), 90 parts of a mixed solvent of 2-butanone and cyclohexanone, and 200 parts of a glass bead with a diameter of 0.9 mm for 4 hours at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The dispersion process was performed under such a condition that the discs were rotated 1,800 times per minute. After the dispersion process, the glass bead was removed from the dispersed liquid and an application liquid 6 for the charge generation layer was prepared.

[Preparation of Application Liquid 7 for Charge Generation Layer]

A dispersion process was performed on 6 parts of titanyl phthalocyanine having strong peaks at Bragg angles 2θ of 9.6°±0.2°, 24.0° 0.2°, and 27.2°+0.2° in an X-ray diffraction spectrum using CuKα line, 3 parts of titanyl phthalocyanine having strong peaks at Bragg angles 2θ of 7.6°+0.2°, 25.3°+0.2°, and 28.6°+0.2° in an X-ray diffraction spectrum using CuKα line, 11 parts of polyvinyl butyral (product name: BX-55, manufactured by Sekisui Chemical Co., Ltd.), 90 parts of a mixed solvent of 2-butanone and cyclohexanone, and 200 parts of a glass bead with a diameter of 0.9 mm for 4 hours at cooling water temperature of 18° C., by using a sand mill (K-800, manufactured by Igarashi Machine Manufacturing Co., Ltd. (currently IMEX Co., Ltd.), disc diameter: 70 mm, number of discs: 5). The dispersion process was performed under such a condition that the discs were rotated 1,800 times per minute. After the dispersion process, the glass bead was removed from the dispersed liquid and an application liquid 7 for the charge generation layer was prepared.

[Preparation of Application Liquid 1 for Charge Transfer Layer]

As a charge transfer substance, 40 parts of a charge transfer substance having an ionization potential of 5.4 eV and illustrated by the following formula (A5), (A5)

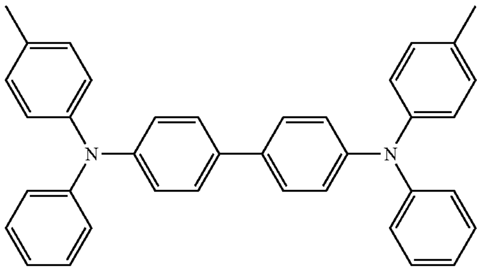

60 parts of a charge transfer substance having an ionization potential of 5.3 eV and illustrated by the following formula (A6), (A6)

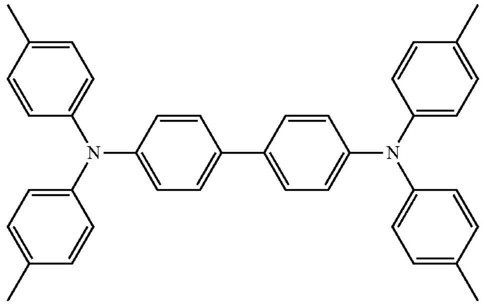

and 100 parts of polycarbonate (product name: Iupilon Z-400, manufactured by Mitsubishi Engineering-Plastics Corporation) were dissolved into 225 parts of ortho-xylene/375 parts of methyl benzoate/150 parts of dimethoxymethane to prepare an application liquid 1 for the charge transfer layer.

[Preparation of Application Liquid 2 for Charge Transfer Layer]

As a charge transfer substance, 100 parts of a charge transfer substance having an ionization potential of 5.5 eV and illustrated by the following formula (A7)

(A7)

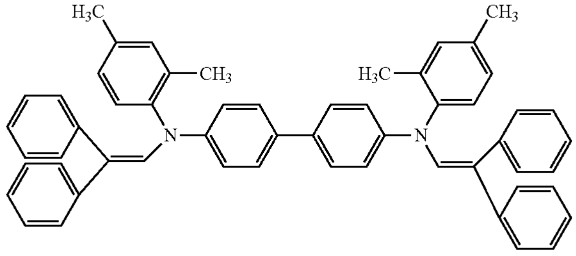

and 100 parts of polycarbonate (product name: Iupilon Z-400, manufactured by Mitsubishi Engineering-Plastics Corporation) were dissolved into 225 parts of ortho-xylene/375 parts of methyl benzoate/150 parts of dimethoxymethane to prepare an application liquid 2 for the charge transfer layer.

[Preparation of Application Liquid 3 for Charge Transfer Layer]

As a charge transfer substance, 100 parts of a charge transfer substance having an ionization potential of 5.5 eV and illustrated by the following formula (A8)

(A8)

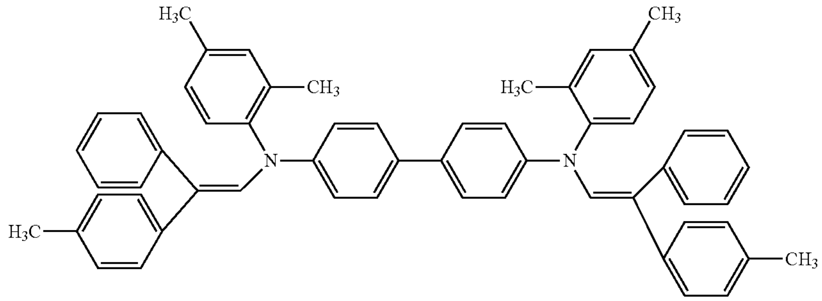

and 100 parts of polycarbonate (product name: Iupilon Z-400, manufactured by Mitsubishi Engineering-Plastics Corporation) were dissolved into 225 parts of ortho-xylene/375 parts of methyl benzoate/150 parts of dimethoxymethane to prepare an application liquid 3 for the charge transfer layer.

[Preparation of Application Liquid 4 for Charge Transfer Layer]

As a charge transfer substance, 100 parts of a charge transfer substance having an ionization potential of 5.5 eV and illustrated by the following formula (A9)

(A9)

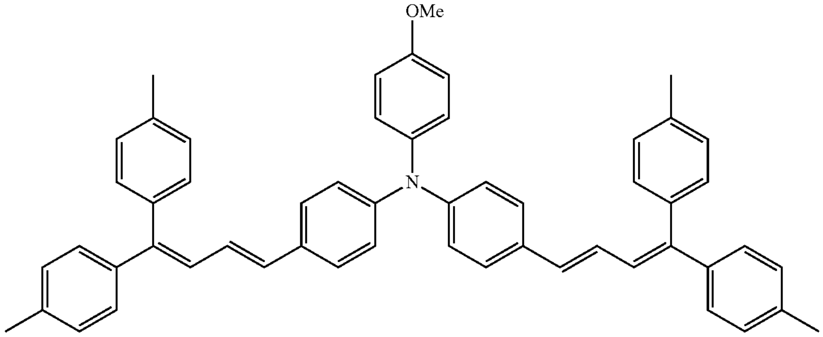

and 100 parts of polycarbonate (product name: Iupilon Z-400, manufactured by Mitsubishi Engineering-Plastics Corporation) were dissolved into 225 parts of ortho-xylene/375 parts of methyl benzoate/150 parts of dimethoxymethane to prepare an application liquid 4 for the charge transfer layer.

[Preparation of Application Liquid 5 for Charge Transfer Layer]

As a charge transfer substance, 90 parts of a charge transfer substance having an ionization potential of 5.35 eV and illustrated by the following formula (A10)

(A10)

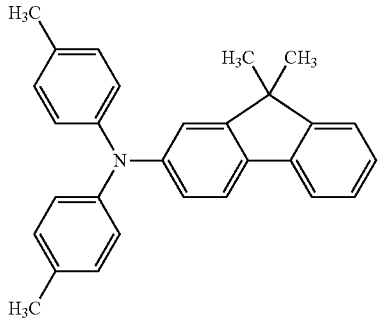

and 100 parts of a polyarylate resin that includes a structure unit illustrated by the following formula (A11)

(A11)

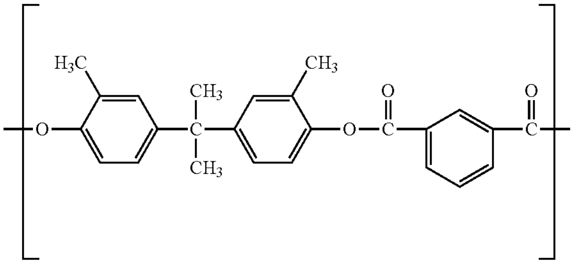

and a structure unit illustrated by the following formula (A12)

(A12)

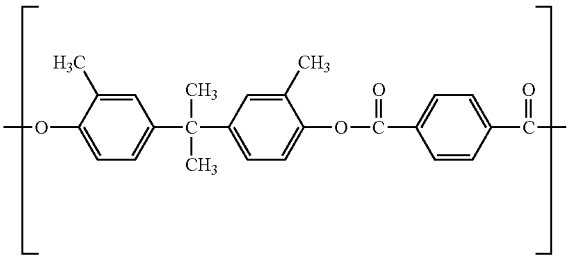

at a ratio of 5/5 and that has a weight-average molecular weight of 100,000 were dissolved into a mixed solvent of 300 parts of dimethoxymethane and 700 parts of chlorobenzene to prepare an application liquid 5 for the charge transfer layer.

[Preparation of Application Liquid 6 for Charge Transfer Layer]

As a charge transfer substance, 70 parts of the triarylamine compound illustrated by the aforementioned formula (A10), 10 parts of a triarylamine compound illustrated by the following formula (A13), (A13)

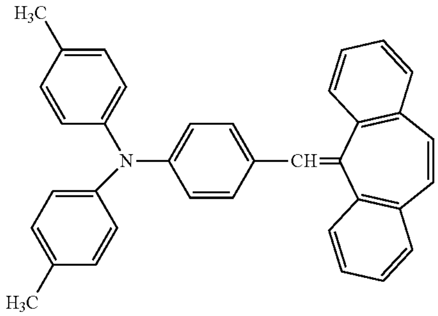

and 100 parts of polycarbonate (product name: Iupilon Z-200, manufactured by Mitsubishi Engineering-Plastics Corporation) were dissolved into 630 parts of monochlorobenzene to prepare an application liquid 6 for the charge transfer layer.

[Preparation of Application Liquid 7 for Charge Transfer Layer]

As a charge transfer substance, 50 parts of a charge transfer substance illustrated by the following formula (A14), 100 parts of a polycarbonate resin that includes a structure unit illustrated by the following formula (A15)

(A15)

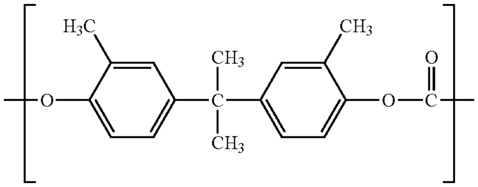

and a structure unit illustrated by the following formula (A16)

(A16)

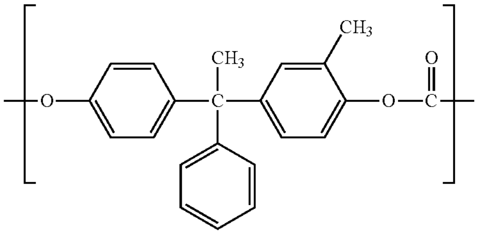

as a repeat unit at a ratio of 51%/49% by mol and that has a terminal structure formula derived from p-t-butylphenol, 8 parts of 2,6-di-t-butyl-4-methylphenol, and 0.03 parts of a silicone oil (product name: KF96, manufactured by Shin-Etsu Chemical Co., Ltd.) were dissolved into 640 parts of a mixed solvent of tetrahydrofuran/toluene (mass ratio 8/2) to prepare an application liquid 7 for the charge transfer layer.

[Preparation of Application Liquid 8 for Charge Transfer Layer]

As a charge transfer substance, 25 parts of the charge transfer substance illustrated by the aforementioned formula (A6), 25 parts of a charge transfer substance illustrated by the following formula (A17), (A14)

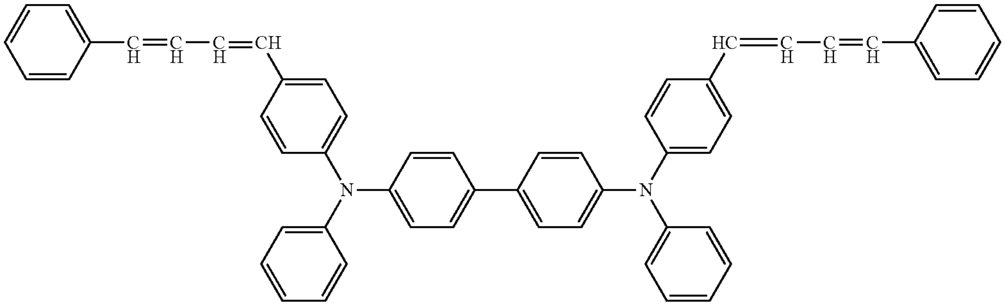

(A17)

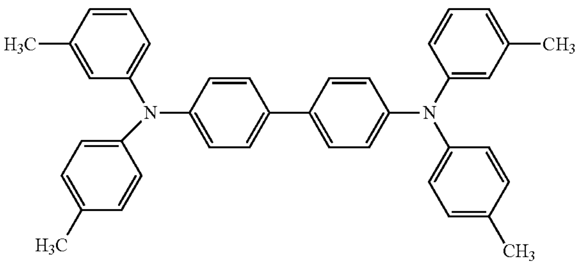

100 parts the polycarbonate resin that includes the structure unit illustrated by the aforementioned formula (A15) and the structure unit illustrated by the aforementioned formula (A16) as a repeat unit at the ratio of 51%/49% by mol and that has the terminal structure formula derived from p-t-butylphenol, and 0.05 parts of a silicone oil (product name: KF96, manufactured by Shin-Etsu Chemical Co., Ltd.) were dissolved into 640 parts of a mixed solvent of tetrahydrofuran/toluene (mass ratio 8/2) to prepare an application liquid 8 for the charge transfer layer.

[Preparation of Application Liquid 9 for Charge Transfer Layer]

As a charge transfer substance, 10 parts of the charge transfer substance illustrated by the aforementioned formula (A6) and 10 parts of polycarbonate (product name: Iupilon Z-400, manufactured by Mitsubishi Engineering-Plastics Corporation) were dissolved into 39 parts of tetrahydrofuran to prepare an application liquid 9 for the charge transfer layer.

[Preparation of Application Liquid 10 for Charge Transfer Layer]

As a charge transfer substance, 30 parts of (4-methoxy-4'-(4-methyl-α-phenylstyryl)triphenylamine), 30 parts of polycarbonate (product name: Iupilon Z-300, manufactured by Mitsubishi Engineering-Plastics Corporation), and 1 part of a tin oxide fine particle were dissolved into 200 parts of dioxolane to prepare an application liquid 10 for the charge transfer layer.

[Preparation of Application Liquid 11 for Charge Transfer Layer]

An application liquid 11 for the charge transfer layer was prepared by dissolving 50 parts of a charge transfer substance illustrated by the following formula (A18), (A18)

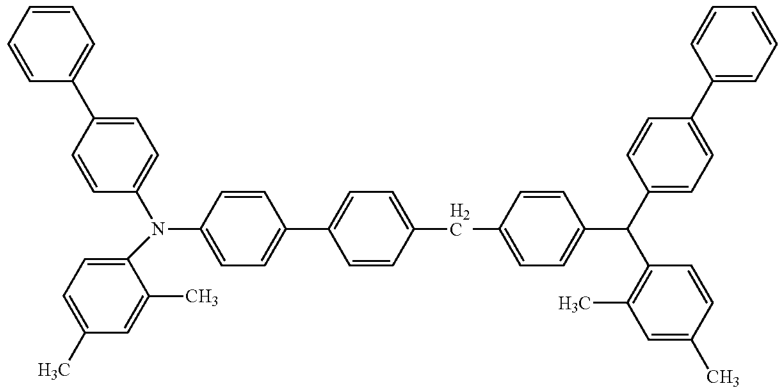

50 parts of polycarbonate (product name: Iupilon Z-400, manufactured by Mitsubishi Engineering-Plastics Corporation), and 1.5 parts of a dicyano compound expressed by the following formula (A19)

(A19)

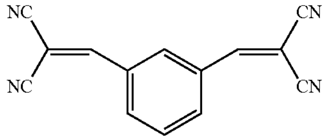

into 4 parts of di-ter-butylhydroxytoluene and dichloromethane.

[Preparation of Application Liquid 12 for Charge Transfer Layer]

An application liquid 12 for the charge transfer layer was prepared by dissolving 27.0 parts of DEH (p-diethylamino) benzaldehyde dihenylhydrazone), 37.9 parts of bisphenol A (Bayer AG), and 0.48 parts of acetosol yellow into a mixed solvent of tetrahydrofuran and 1,4-dioxane.

[Preparation of Application Liquid 1 for Single-Layer Photosensitive Layer]

A milling process was performed on 5 parts of non-metal phthalocyanine, 10 parts of a charge transfer substance (hole transfer substance) illustrated by the following formula (A20), (A20)

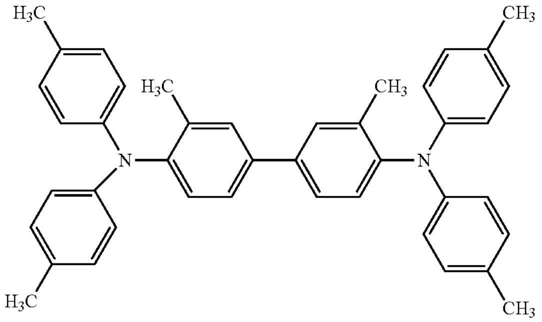

3 parts of a charge transfer substance (electron transfer substance) illustrated by the following formula (A21), (A21)

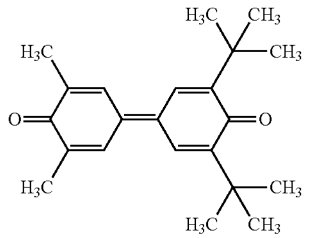

10 parts of polycarbonate (product name: Iupilon Z-400, manufactured by Mitsubishi Engineering-Plastics Corporation), 80 parts of tetrahydrofuran, and 250 parts of a glass bead with a diameter of 0.9 mm for 10 hours at room temperature (23° C.), by using a paint shaker (manufactured by Toyo Seiki Seisaku-sho, Ltd.). In this case, a standard bottle (product name: PS-6, manufactured by Hakuyo Glass Co., Ltd.) was used as a container. The liquid subjected to the milling process as described above was filtered with a filter (product number: N-NO. 125T, pore diameter: 133 μm, manufactured by NBC Meshtec Inc.) to remove the glass bead and an application liquid 1 for a single-layer photosensitive layer was prepared.

<Manufacturing of Electrophotographic Photosensitive Member>

(Photosensitive Member Manufacturing Example 1)

An aluminum cylinder (JIS-A3003, aluminum alloy) with a length of 260.5 mm and a diameter of 30 mm was obtained as a support by a manufacturing method including an extruding step and a drawing step.

The application liquid 1 for the electrically-conductive layer was applied by immersion onto the support to form an application film and the application film was heated and dried for 20 minutes at 150° C. to form an electrically-conductive layer with a film thickness of 19 μm.

Next, the application liquid 1 for the undercoat layer was applied by immersion onto the electrically-conductive layer to form an application film and the application film was heated and dried for 10 minutes at 100° C. to form an undercoat layer with a film thickness of 2.2 μm.

Then, the application liquid 1 for the charge generation layer was applied by immersion onto the undercoat layer to form an application film and the application film was heated and dried for 10 minutes at 100° C. to form a charge generation layer with a film thickness of 140 μm.

Next, the application liquid 1 for the charge transfer layer was applied by immersion onto the charge generation layer to form an application film and the application film was heated and dried for 60 minutes at temperature of 120° C. to form a charge transfer layer with a film thickness of 17 μm.

The heating treatment for the application film of each layer was performed by using an oven set to corresponding temperature. The cylindrical (drum-shaped) photosensitive member 1 was thus manufactured.

$I_{1/2}$ [$\mu J \cdot cm^2$], AR, $LR_i$, and $V_r$ that were characteristic values of the photosensitive member obtained in this case were obtained in the aforementioned methods. The results thereof are illustrated in Table 1 together with the configuration of the photosensitive member manufacturing example 1.

Note that, in Tables 1 and 2, "CPL" means "electrically-conductive layer", "1", "2", "3", "4", and "5" in CPL application liquid No. mean "application liquid 1 for electrically-conductive layer", "application liquid 2 for electrically-conductive layer", "application liquid 3 for electrically-conductive layer", "application liquid 4 for electrically-conductive layer", and "application liquid 5 for electrically-conductive layer", respectively. Moreover, "UCL" means "undercoat layer" and "1", "2", "3", "4", "5", and "6" in UCL application liquid No. mean "application liquid 1 for undercoat layer", "application liquid 2 for undercoat layer", "application liquid 3 for undercoat layer", "application liquid 4 for undercoat layer", "application liquid 5 for undercoat layer", and "application liquid 6 for undercoat layer", respectively. "CGL" means "charge generation layer" and "1", "2", "3", "4", "5", "6", and "7" in CGL application liquid No. mean "application liquid 1 for charge generation layer", "application liquid 2 for charge generation layer", "application liquid 3 for charge generation layer", "application liquid 4 for charge generation layer", "application liquid 5 for charge generation layer", "application liquid 6 for charge generation layer", and "application liquid 7 for charge generation layer", respectively. "CTL" means "charge transfer layer" and "1", "2", "3", "4", "5", "6", "7", "8", "9", "10", "11", and "12" in CTL application liquid No. mean "application liquid 1 for charge transfer layer", "application liquid 2 for charge transfer layer", "application liquid 3 for charge transfer layer", "application liquid 4 for charge transfer layer", "application liquid 5 for charge transfer layer", "application liquid 6 for charge transfer layer", "application liquid 7 for charge transfer layer", "application liquid 8 for charge transfer layer", "application liquid 9 for charge transfer layer", "application liquid 10 for charge transfer layer", "application liquid 11 for charge transfer layer", and "application liquid 12 for charge transfer layer", respectively. "Film with thickness of 38 m was formed by using application liquid 1 for single-layer photosensitive layer" means forming "application liquid 1 for single-layer photosensitive layer" on the aluminum cylinder at a film thickness of 38 μm.

Moreover, drying temperature and drying time in the case where the immersion application was performed by using CPL application liquid Nos. 1 to 5 in Tables 1 and 2 were as follows.

CPL application liquid No. 1: drying temperature 150° C., drying time 20 minutes CPL application liquid No. 2: drying temperature 145° C., drying time 60 minutes CPL application liquid No. 3: drying temperature 170° C., drying time 20 minutes CPL application liquid No. 4: drying temperature 170° C., drying time 40 minutes CPL application liquid No. 5: drying temperature 140° C., drying time 30 minutes Furthermore, drying temperature and drying time in the case where the immersion application was performed by using UCL application liquid Nos. 1 to 6 in Tables 1 and 2 were as follows.

UCL application liquid No. 1: drying temperature 100° C., drying time 10 minutes UCL application liquid No. 2: drying temperature 100° C., drying time 10 minutes UCL application liquid No. 3: drying temperature 160° C., drying time 30 minutes UCL application liquid No. 4: drying temperature 160° C., drying time 30 minutes UCL application liquid No. 5: drying temperature 100° C., drying time 10 minutes UCL application liquid No. 6: drying temperature 120° C., drying time 30 minutes Moreover, drying temperature and drying time in the case where the immersion application was performed by using CGL application liquid Nos. 1 to 7 in Tables 1 and 2 were as follows.

CGL application liquid No. 1: drying temperature 100° C., drying time 10 minutes
CGL application liquid No. 2: drying temperature 100° C., drying time 10 minutes
CGL application liquid No. 3: drying temperature 100° C., drying time 10 minutes
CGL application liquid No. 4: drying temperature 125° C., drying time 2 minutes
CGL application liquid No. 5: drying temperature 100° C., drying time 10 minutes
CGL application liquid No. 6: drying temperature 100° C., drying time 15 minutes
CGL application liquid No. 7: drying temperature 100° C., drying time 15 minutes Furthermore, drying temperature and drying time in the case where the immersion application was performed by using CTL application liquid Nos. 1 to 12 in Tables 1 and 2 were as follows.

CTL application liquid No. 1: drying temperature 125° C., drying time 30 minutes
CTL application liquid No. 2: drying temperature 125° C., drying time 30 minutes
CTL application liquid No. 3: drying temperature 125° C., drying time 30 minutes
CTL application liquid No. 4: drying temperature 125° C., drying time 30 minutes
CTL application liquid No. 5: drying temperature 125° C., drying time 30 minutes
CTL application liquid No. 6: drying temperature 125° C., drying time 30 minutes
CTL application liquid No. 7: drying temperature 125° C., drying time 30 minutes
CTL application liquid No. 8: drying temperature 125° C., drying time 30 minutes
CTL application liquid No. 9: drying temperature 120° C., drying time 30 minutes
CTL application liquid No. 10: drying temperature 125° C., drying time 30 minutes
CTL application liquid No. 11: drying temperature 125° C., drying time 30 minutes
CTL application liquid No. 12: drying temperature 100° C., drying time 60 minutes Moreover, drying temperature and drying time in the case where the immersion application was performed by using "application liquid 1 for single-layer photosensitive layer" in photosensitive member manufacturing example 79 of Table 2 were as follows.

Drying temperature 130° C., drying time 30 minutes

Furthermore, "-" in Tables 1 and 2 means that a corresponding layer was not formed.

Photosensitive Member Manufacturing Examples 2 to 83

Photosensitive members 2 to 83 were manufactured as in the photosensitive member manufacturing example 1 except for the points that the electrically-conductive layer, the undercoat layer, the charge generation layer, and the charge transfer layer were changed as illustrated in Tables 1 and 2 in the photosensitive member manufacturing example 1. Note that heating treatments of the application films of the electrically-conductive layer, the undercoat layer, the charge generation layer, and the charge transfer layer were each performed by using an oven set to the corresponding temperature for the corresponding time as described above.

Moreover, $I_{1/2}$ [ρJ·cm$^2$], AR, $LR_i$, and $V_r$ that were the characteristics values of the photosensitive members 2 to 83 were obtained as in the photosensitive member manufacturing example 1. The results thereof are illustrated in Tables 1 and 2 together with configurations of photosensitive member manufacturing examples 2 to 83.

TABLE 1

| Photosensitive member manufacturing example No. | Layers of photosensitive member | | | | | |
|---|---|---|---|---|---|---|
| | CPL | | UCL | | CGL | |
| | Application liquid No. | Film thickness/μm | Application liquid No. | Film thickness/μm | Application liquid No. | Film thickness/nm |
| 1 | 1 | 19 | 1 | 2.2 | 1 | 140 |
| 2 | 1 | 19 | 1 | 2.2 | 1 | 160 |
| 3 | 1 | 19 | 1 | 2.2 | 1 | 180 |
| 4 | 1 | 19 | 1 | 2.2 | 1 | 200 |
| 5 | 1 | 19 | 1 | 2.2 | 1 | 220 |
| 6 | 1 | 19 | 1 | 2.2 | 1 | 250 |
| 7 | 1 | 19 | 1 | 1.1 | 1 | 200 |
| 8 | 1 | 19 | 1 | 2.2 | 1 | 200 |
| 9 | 1 | 19 | 1 | 2.2 | 1 | 200 |
| 10 | 1 | 19 | 1 | 2.2 | 1 | 120 |
| 11 | 1 | 19 | 1 | 2.2 | 1 | 130 |
| 12 | 1 | 19 | 1 | 2.2 | 1 | 200 |
| 13 | 1 | 19 | 1 | 2.2 | 1 | 250 |
| 14 | — | 0 | 1 | 2.2 | 1 | 200 |
| 15 | 1 | 19 | 2 | 0.65 | 1 | 180 |
| 16 | 1 | 19 | 2 | 0.65 | 1 | 200 |
| 17 | 1 | 19 | 2 | 0.65 | 1 | 220 |
| 18 | 1 | 19 | 2 | 0.65 | 1 | 250 |
| 19 | 1 | 19 | 2 | 0.65 | 1 | 200 |
| 20 | 1 | 19 | 2 | 0.65 | 1 | 200 |
| 21 | 1 | 19 | 2 | 1.0 | 1 | 220 |
| 22 | 1 | 19 | 2 | 1.0 | 1 | 220 |
| 23 | 1 | 19 | 2 | 1.0 | 1 | 220 |
| 24 | — | 0 | 2 | 0.65 | 1 | 200 |
| 25 | 2 | 19 | 3 | 0.7 | 1 | 200 |

TABLE 1-continued

| | | | | | | |
|---|---|---|---|---|---|---|
| 26 | 2 | 19 | 3 | 0.7 | 1 | 200 |
| 27 | 2 | 19 | 3 | 0.7 | 1 | 200 |
| 28 | 2 | 19 | 3 | 2.0 | 1 | 200 |
| 29 | — | 0 | 3 | 0.7 | 1 | 200 |
| 30 | — | 0 | 4 | 0.7 | 1 | 200 |
| 31 | — | 0 | 4 | 0.7 | 1 | 170 |
| 32 | — | 0 | 4 | 2.0 | 1 | 200 |
| 33 | — | 0 | 4 | 2.0 | 1 | 160 |
| 34 | 3 | 10 | — | 0.0 | 1 | 200 |
| 35 | 3 | 10 | — | 0.0 | 1 | 170 |
| 36 | 1 | 19 | 1 | 2.2 | 1 | 200 |
| 37 | 1 | 19 | 1 | 2.2 | 1 | 200 |
| 38 | 1 | 19 | 1 | 2.2 | 1 | 200 |
| 39 | 1 | 19 | 1 | 2.2 | 2 | 190 |
| 40 | 1 | 19 | 1 | 2.2 | 2 | 200 |
| 41 | 1 | 19 | 1 | 2.2 | 2 | 270 |
| 42 | 1 | 19 | 1 | 2.2 | 2 | 290 |

| Photosensitive member manufacturing example No. | Layers of photosensitive member CTL Application liquid No. | Film thickness/μm | Characteristic values $I_{1/2}$/μJ/cm$^2$ | AR | $LR_i$ | $V_r$/V |
|---|---|---|---|---|---|---|
| 1 | 1 | 17 | 0.166 | 0.290 | 164 | 17 |
| 2 | 1 | 17 | 0.155 | 0.220 | 128 | 14 |
| 3 | 1 | 17 | 0.146 | 0.134 | 95 | 13 |
| 4 | 1 | 17 | 0.136 | 0.091 | 66 | 10 |
| 5 | 1 | 17 | 0.132 | 0.073 | 53 | 8 |
| 6 | 1 | 17 | 0.129 | 0.079 | 61 | 9 |
| 7 | 1 | 17 | 0.135 | 0.073 | 50 | 8 |
| 8 | 1 | 14 | 0.161 | 0.098 | 58 | 9 |
| 9 | 1 | 20 | 0.119 | 0.074 | 62 | 9 |
| 10 | 1 | 20 | 0.168 | 0.435 | 264 | 24 |
| 11 | 1 | 20 | 0.165 | 0.365 | 222 | 21 |
| 12 | 1 | 23 | 0.107 | 0.070 | 62 | 9 |
| 13 | 1 | 23 | 0.103 | 0.068 | 62 | 9 |
| 14 | 1 | 17 | 0.131 | 0.090 | 63 | 6 |
| 15 | 1 | 17 | 0.149 | 0.234 | 421 | 28 |
| 16 | 1 | 17 | 0.147 | 0.197 | 400 | 27 |
| 17 | 1 | 17 | 0.144 | 0.150 | 393 | 27 |
| 18 | 1 | 17 | 0.141 | 0.104 | 370 | 25 |
| 19 | 1 | 14 | 0.169 | 0.211 | 355 | 25 |
| 20 | 1 | 20 | 0.126 | 0.160 | 366 | 29 |
| 21 | 1 | 14 | 0.169 | 0.224 | 541 | 28 |
| 22 | 1 | 17 | 0.151 | 0.182 | 522 | 30 |
| 23 | 1 | 20 | 0.138 | 0.167 | 533 | 32 |
| 24 | 1 | 17 | 0.135 | 0.193 | 388 | 24 |
| 25 | 1 | 17 | 0.143 | 0.233 | 672 | 50 |
| 26 | 1 | 14 | 0.164 | 0.275 | 691 | 59 |
| 27 | 1 | 20 | 0.124 | 0.203 | 658 | 54 |
| 28 | 1 | 14 | 0.167 | 0.297 | 767 | 66 |
| 29 | 1 | 17 | 0.129 | 0.183 | 280 | 32 |
| 30 | 1 | 17 | 0.129 | 0.354 | 93 | 21 |
| 31 | 1 | 20 | 0.125 | 0.382 | 124 | 25 |
| 32 | 1 | 17 | 0.138 | 0.211 | 492 | 39 |
| 33 | 1 | 20 | 0.134 | 0.243 | 543 | 44 |
| 34 | 1 | 17 | 0.158 | 0.231 | 291 | 38 |
| 35 | 1 | 20 | 0.152 | 0.266 | 324 | 45 |
| 36 | 2 | 17 | 0.141 | 0.118 | 233 | 25 |
| 37 | 3 | 17 | 0.138 | 0.103 | 201 | 22 |
| 38 | 4 | 17 | 0.129 | 0.094 | 148 | 19 |
| 39 | 1 | 17 | 0.147 | 0.335 | 772 | 92 |
| 40 | 1 | 17 | 0.139 | 0.351 | 710 | 87 |
| 41 | 1 | 17 | 0.130 | 0.406 | 515 | 70 |
| 42 | 1 | 17 | 0.128 | 0.382 | 468 | 64 |

TABLE 2

| Photosensitive member manufacturing example No. | Layers of photosensitive member: CPL Application liquid No. | CPL Film thickness/µm | UCL Application liquid No. | UCL Film thickness/µm | CGL Application liquid No. | CGL Film thickness/µm | CTL Application liquid No. | CTL Film thickness/µm | Characteristic values: $I_{1/2}$/µJ/cm$^2$ | AR | LRi | V/V |
|---|---|---|---|---|---|---|---|---|---|---|---|---|
| 43 | 1 | 19 | 1 | 2.2 | 2 | 250 | 1 | 10 | 0.168 | 0.464 | 267 | 54 |
| 44 | 1 | 19 | 1 | 2.2 | 2 | 250 | 1 | 14 | 0.149 | 0.416 | 411 | 62 |
| 45 | 1 | 19 | 1 | 2.2 | 2 | 250 | 1 | 20 | 0.121 | 0.368 | 703 | 85 |
| 46 | 1 | 19 | 1 | 2.2 | 2 | 250 | 1 | 22 | 0.115 | 0.360 | 775 | 92 |
| 47 | 1 | 19 | 1 | 2.2 | 2 | 290 | 1 | 20 | 0.112 | 0.367 | 518 | 62 |
| 48 | 1 | 19 | 1 | 1.6 | 2 | 290 | 1 | 20 | 0.112 | 0.352 | 488 | 59 |
| 49 | 1 | 19 | 1 | 1.1 | 2 | 290 | 1 | 20 | 0.111 | 0.323 | 418 | 55 |
| 50 | 1 | 19 | 1 | 2.2 | 2 | 290 | 1 | 23 | 0.107 | 0.368 | 634 | 68 |
| 51 | 1 | 19 | 2 | 0.65 | 3 | 140 | 1 | 13 | 0.290 | 0.509 | 453 | 54 |
| 52 | 1 | 19 | 2 | 0.65 | 3 | 140 | 1 | 17 | 0.249 | 0.435 | 492 | 73 |
| 53 | 1 | 19 | 2 | 0.65 | 3 | 140 | 1 | 20 | 0.224 | 0.410 | 521 | 78 |
| 54 | 1 | 19 | 2 | 0.65 | 3 | 140 | 1 | 23 | 0.211 | 0.398 | 528 | 79 |
| 55 | 2 | 19 | 2 | 0.65 | 3 | 160 | 5 | 21 | 0.180 | 0.306 | 860 | 128 |
| 56 | 1 | 19 | 2 | 0.65 | 3 | 270 | 6 | 17 | 0.158 | 0.382 | 804 | 112 |
| 57 | 1 | 19 | 2 | 0.65 | 3 | 270 | 1 | 17 | 0.145 | 0.374 | 480 | 51 |
| 58 | 1 | 19 | 2 | 0.65 | 2 | 290 | 1 | 17 | 0.142 | 0.453 | 721 | 82 |
| 59 | 1 | 19 | 1 | 2.2 | 2 | 290 | 6 | 17 | 0.172 | 0.369 | 801 | 111 |
| 60 | 1 | 19 | 2 | 0.7 | 2 | 290 | 1 | 23 | 0.127 | 0.472 | 740 | 99 |
| 61 | 1 | 19 | 1 | 2.2 | 2 | 290 | 6 | 23 | 0.155 | 0.385 | 843 | 120 |
| 62 | 1 | 19 | 1 | 2.20 | 2 | 220 | 1 | 17 | 0.135 | 0.390 | 635 | 85 |
| 63 | 1 | 19 | 1 | 2.2 | 2 | 250 | 1 | 17 | 0.132 | 0.404 | 553 | 74 |
| 64 | 1 | 19 | 1 | 2.2 | 2 | 250 | 1 | 17 | 0.134 | 0.396 | 572 | 77 |
| 65 | 1 | 19 | 1 | 2.2 | 2 | 250 | 1 | 17 | 0.136 | 0.388 | 591 | 80 |
| 66 | — | 0 | 1 | 1.1 | 2 | 400 | 7 | 14 | 0.151 | 0.398 | 768 | 94 |
| 67 | — | 0 | 1 | 1.1 | 2 | 400 | 7 | 17 | 0.130 | 0.371 | 794 | 98 |
| 68 | — | 0 | 1 | 1.1 | 2 | 400 | 7 | 20 | 0.118 | 0.391 | 810 | 103 |
| 69 | — | 0 | 1 | 1.1 | 2 | 400 | 7 | 23 | 0.111 | 0.382 | 820 | 106 |
| 70 | — | 0 | 1 | 1.1 | 2 | 400 | 7 | 25 | 0.108 | 0.375 | 851 | 111 |
| 71 | — | 0 | 1 | 1.1 | 2 | 400 | 8 | 14 | 0.175 | 0.447 | 917 | 106 |
| 72 | — | 0 | 1 | 1.1 | 2 | 400 | 8 | 17 | 0.147 | 0.415 | 942 | 115 |
| 73 | — | 0 | 1 | 1.1 | 2 | 400 | 8 | 20 | 0.136 | 0.435 | 959 | 119 |
| 74 | — | 0 | 1 | 1.1 | 2 | 400 | 8 | 23 | 0.124 | 0.431 | 910 | 118 |
| 75 | — | 0 | 1 | 1.1 | 2 | 400 | 8 | 25 | 0.124 | 0.425 | 957 | 123 |
| 76 | — | 0 | 1 | 1.2 | 4 | 700 | 9 | 30 | 0.126 | 0.311 | 1016 | 91 |
| 77 | 4 | 25 | — | 0.0 | 3 | 200 | 1 | 30 | 0.310 | 0.334 | 186 | 43 |
| 78 | 5 | 15 | 5 | 0.7 | 3 | 120 | 5 | 11 | 0.340 | 0.326 | 285 | 86 |
| 79 | Film with thickness of 38 µm was formed by using application liquid 1 for single-layer photosensitive layer | | | | | | | | 0.159 | 0.206 | 1892 | 167 |
| 80 | — | 0 | 6 | 1.0 | 2 | 200 | 10 | 20 | 0.190 | 0.422 | 726 | 104 |
| 81 | — | 0 | — | 0.0 | 5 | 200 | 11 | 35 | 0.531 | 0.405 | 254 | 116 |
| 82 | — | 0 | — | 0.0 | 6 | 250 | 12 | 20 | 0.080 | 0.342 | 928 | 86 |
| 83 | — | 0 | — | 0.0 | 7 | 250 | 12 | 20 | 0.078 | 0.340 | 918 | 81 |

[Evaluation]

Examples 1 to 50 and Comparative Examples 1 to 33 were evaluated by using the aforementioned photosensitive member manufacturing examples 1 to 83. The evaluation was performed as follows. The results thereof are illustrated in Tables 3 and 4.

<Evaluation Apparatus>

A laser beam printer (product name: Laser Jet Enterprise M609dn) manufactured by Hewlett-Packard Company was prepared as an electrophotographic apparatus for evaluation and was modified such that process speed, a voltage applied to a charging roller, an image exposure amount, and a voltage applied to a development roller can be adjusted and measured.

Regarding output of images, each of drums of the aforementioned photosensitive member manufacturing examples 1 to 83 was attached to a process cartridge of the aforementioned laser printer and a monochrome image was outputted.

<Checking of Whether Analog Gradation Characteristic was Maintained>

A dark portion potential was set to 450 V and such an exposure amount that a surface potential after exposure was 225 V was obtained. An absolute value of a difference between the dark portion potential 450 V and a surface potential in the case where irradiation was performed at a light amount ten times the aforementioned exposure amount was determined to be ΔV. In order to align the analog gradation characteristic on the EV curve, such an exposure amount that the surface potential after exposure was 450-0.99 ΔV was set as an image exposure amount. An apparatus in which a potential probe (product name: model 6000B-8, manufactured by Trek Japan) was attached to a development position of the process cartridge was used for the measurement of the photosensitive member surface potentials in the potential setting and the measurement was performed by using a surface electrometer (product name: model 344, manufactured by Trek Japan).

Next, dither patterns for evaluation were prepared. FIGS. 9A to 9E are examples in the case where the area ratio is 0%

(FIG. 9A), 25% (FIG. 9B), 50% (FIG. 9C), 75% (FIG. 9D), and 100% (FIG. 9E) in a line-growth dither pattern for a line number of 150 at a resolution of 600 dpi. In actual measurement, images of 32 levels (33 patterns in the case were a solid white with an area ratio of 0% is included) of area ratios obtained by evenly dividing the entire range of area ratio into 32 pieces were outputted. In this case, step interpolation to less than one pixel was performed by using pulse width modulation (PWM). A similar 32-level line growth dither pattern was prepared for a line number of 600 in addition to the line number of 150.

Figure 10:
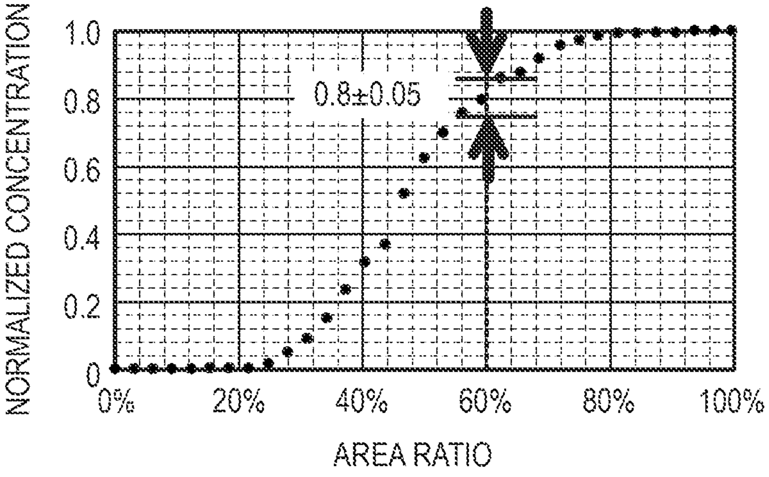
FIG. 10 illustrates an example in which an area ratio-normalized concentration graph relating to a 32-level line growth dither pattern for a line number of 600 is measured at a process speed of 300 [mm/s] for a photosensitive member manufacturing example 1 of the present invention.

An image of the aforementioned 32-level line growth dither pattern for the line number of 600 was outputted by adjusting the voltages applied to the charging roller and the development roller such that an absolute value $V_{back}$ [V] of a difference between the dark portion potential and the development potential and an absolute value $V_{cont}$ [V] of a difference between the development potential and the exposure potential were $V_{back}$=200 V and $V_{cont}$=200 V, respectively, when the image exposure amount set in the aforementioned method was fixed. A toner concentration of each level in the outputted image was measured by using a reflective densitometer (product name: RD-918, manufactured by Macbeth Corporation). The measurement values were illustrated as a graph in which the horizontal axis represents the area ratio and the vertical axis represents a value obtained by subtracting a concentration of a white solid portion with the area ratio of 0% from concentration data for each level and by normalizing the resultant value by using a concentration of an area ratio of 100%. FIG. 10 illustrates a graph in the case where the measurement was performed for the aforementioned photosensitive member manufacturing example 1 at process speed of 300 mm/s as an example. When the normalized concentration for the area ratio of 60% was in a range of 0.8=0.05 in this graph, the analog gradation characteristic was determined to be maintained. When the normalized concentration was above 0.85, the image exposure amount was reduced by about 10% and the area ratio-normalized concentration graph was measured again. Meanwhile, when the normalized concentration was below 0.75, the image exposure amount was increased by about 10% and the area ratio-normalized concentration graph was measured again. The aforementioned operation was repeatedly performed until the normalized concentration for the area ratio of 60% was in the range of 0.8+0.05 and the final image exposure amount was determined.

<Evaluation of Digital Gradation Characteristic>

The process speed was set to 200 mm/s, the dark portion potential was set to 450 V, and the development potential was set to 250 V, and an image of a solid pattern was outputted at the aforementioned image exposure amount determined in the method in <Checking of Whether Analog Gradation Characteristic was Maintained>. A concentration of this output image was determined to be a maximum concentration value for concentration normalization determined for each photosensitive member manufacturing example to be evaluated.

Next, the process speed was set to 300 mm/s, 400 mm/s, or 500 mm/s, the dark portion potential was set to 450 V, and the development potential was set to 250 V, and an image of the aforementioned 32-level line growth dither pattern for the line number of 150 was outputted at the image exposure amount determined in the aforementioned method. A toner concentration for each level in the outputted image was measured by using a reflective densitometer (product name: RD-918, manufactured by Macbeth Corporation). The measurement values were illustrated as a graph in which the horizontal axis represents the area ratio and the vertical axis represents a value obtained by subtracting a concentration of a white solid portion with the area ratio of 0% from concentration data for each level and by normalizing the resultant value by using the aforementioned maximum concentration value for concentration normalization, and the following two numerical values were calculated.

Figure 11:
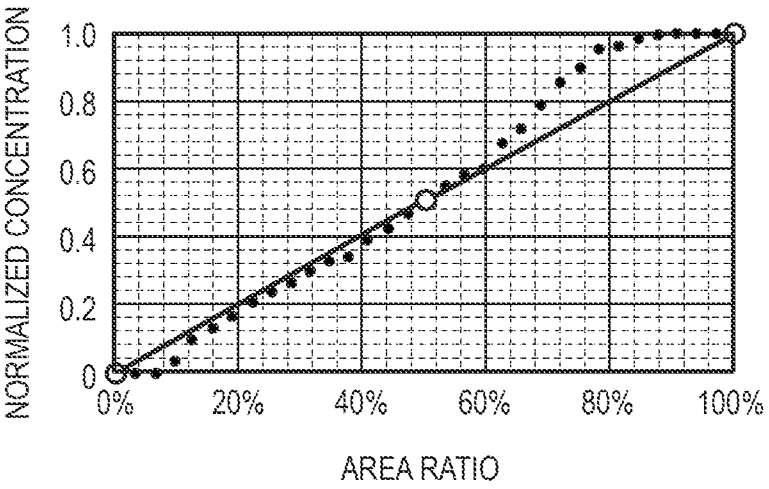
FIG. 11 is a diagram explaining a method of calculating a "high light gradation characteristic" and a "shadow gradation characteristics" on the area ratio-normalized concentration graph that are used for evaluation in the present invention.

(i) In an area ratio-normalized concentration graph as illustrated in FIG. 11, two points for the area ratios of 0% and 50% were connected to each other by a straight line and differences thereof from the respective pieces of data for the 16 levels in a range of the area ratio of 0 to 50% were obtained and averaged as "high light gradation characteristic". The closer the thus-obtained value is to 0, the better the gradation characteristic in a high light portion is.

(ii) In the area ratio-normalized concentration graph as illustrated in FIG. 11, two points for the area ratios of 50% and 100% were connected to each other by a straight line and differences thereof from the respective pieces of data for the 16 levels in a range of the area ratio of 50 to 100% were obtained and averaged as "shadow gradation characteristic". The closer the thus-obtained value is to 0, the better the gradation characteristic in a shadow portion is.

<Evaluation of 6 pt Outline Character Visibility>

The process speed was set to 300 mm/s, 400 mm/s, or 500 mm/s, the dark portion potential was set to 450 V, and the development potential was set to 250 V, and an image of outline kanji characters "denkyo (電驚)" in the MS Ming font with a font size of 6 pt was outputted at the aforementioned image exposure amount determined in <Checking of Whether Analog Gradation Characteristic was Maintained>. This output image was visually observed and the 6 pt outline character visibility was evaluated based on the following criteria.

Rank A: The outline letters of "denkyo" could be clearly read.

Rank B: Blur was observed in the outline letters of "denkyo".

Rank C: The outline letters of "denkyo" were almost illegible.

Rank X: Black solid portions of the outline letters of "denkyo" were faint.

The ranks A and B in the aforementioned evaluation were determined to be good 6 pt outline character visibility.

<Evaluation of 3 pt Character Visibility>

The process speed was set to 300 mm/s, 400 mm/s, or 500 mm/s, the dark portion potential was set to 450 V, and the development potential was set to 250 V, and an image of kanji characters "denkyo" in the MS Ming font with a font size of 3 pt was outputted at the aforementioned image exposure amount determined in <Checking of Whether Analog Gradation Characteristic was Maintained>. This output image was visually observed and the 3 pt character visibility was evaluated based on the following criteria.

Rank A: The letters of "denkyo" could be clearly read.

Rank B: Blur was observed in the letters of "denkyo".

Rank C: The letters of "denkyo" were faint.

The ranks A and B in the aforementioned evaluation were determined to be good 3 pt character visibility.

<Evaluation of Isolated One-Dot Reproducibility>

Figure 12:
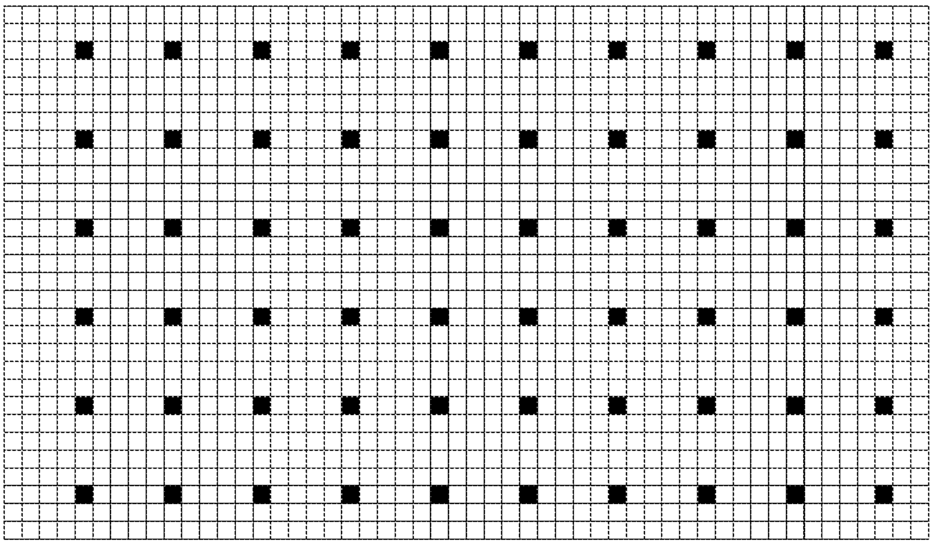
FIG. 12 is a diagram illustrating a half tone of one dot and four spaces used for evaluation in the present invention.

The process speed was set to 300 mm/s, 400 mm/s, or 500 mm/s, the dark portion potential was set to 450 V, and the development potential was set to 250 V, and an image of a halftone of one dot and four spaces illustrated in FIG. 12 was outputted at the aforementioned image exposure amount determined in <Checking of Whether Analog Gradation Characteristic was Maintained>. The toner concentration of this output image was measured by using a reflective densitometer (product name: RD-918, manufactured by Macbeth Corporation) and isolated one-dot reproducibility was evaluated based on the following criteria.

Rank A: The toner density was 0.084 or more.

Rank B: The toner density was 0.076 or more and less than 0.084.

Rank C: The toner density was 0.059 or more and less than 0.076.

Rank D: The toner density was less than 0.059.

The ranks A and B in the aforementioned evaluation were determined to be good isolated one-dot reproducibility.

TABLE 3

| | | 300 mm/s | | | | | 400 mm/s | |
|---|---|---|---|---|---|---|---|---|
| | Photosensitive | Digital gradation characteristic | | | | | Digital gradation characteristic | |
| Example No. | member manufacturing example No. | High light gradation characteristic | Shadow gradation characteristic | 6 pt outline character | 3 pt character | Isolated one dot | High light gradation characteristic | Shadow gradation characteristic |
| 1 | 1 | −0.024 | 0.077 | B | A | B | −0.025 | 0.077 |
| 2 | 2 | −0.024 | 0.076 | B | A | A | −0.024 | 0.077 |
| 3 | 3 | −0.023 | 0.074 | B | A | A | −0.024 | 0.075 |
| 4 | 4 | −0.022 | 0.073 | B | A | A | −0.023 | 0.073 |
| 5 | 5 | −0.022 | 0.072 | B | A | A | −0.022 | 0.073 |
| 6 | 6 | −0.022 | 0.072 | B | A | A | −0.023 | 0.073 |
| 7 | 7 | −0.022 | 0.072 | B | A | A | −0.022 | 0.073 |
| 8 | 8 | −0.022 | 0.073 | B | A | A | −0.023 | 0.074 |
| 9 | 9 | −0.022 | 0.072 | B | A | A | −0.023 | 0.073 |
| 10 | 10 | −0.026 | 0.079 | B | A | B | −0.026 | 0.081 |
| 11 | 11 | −0.025 | 0.077 | B | A | B | −0.026 | 0.078 |
| 12 | 12 | −0.022 | 0.072 | B | A | A | −0.023 | 0.073 |
| 13 | 13 | −0.022 | 0.072 | B | A | A | −0.023 | 0.072 |
| 14 | 14 | −0.022 | 0.073 | B | A | A | −0.023 | 0.074 |
| 15 | 15 | −0.027 | 0.074 | B | A | B | −0.028 | 0.075 |
| 16 | 16 | −0.027 | 0.074 | B | A | B | −0.027 | 0.074 |
| 17 | 17 | −0.027 | 0.072 | B | A | B | −0.027 | 0.073 |
| 18 | 18 | −0.026 | 0.071 | B | A | B | −0.027 | 0.072 |
| 19 | 19 | −0.026 | 0.074 | B | A | B | −0.027 | 0.075 |
| 20 | 20 | −0.027 | 0.072 | B | A | B | −0.027 | 0.073 |
| 21 | 21 | −0.035 | 0.074 | B | A | B | −0.036 | 0.075 |
| 22 | 22 | −0.035 | 0.073 | B | B | B | −0.036 | 0.073 |
| 23 | 23 | −0.035 | 0.072 | B | B | B | −0.036 | 0.073 |
| 24 | 24 | −0.027 | 0.074 | B | A | B | −0.027 | 0.074 |
| 25 | 25 | −0.037 | 0.071 | B | B | B | −0.037 | 0.072 |
| 26 | 26 | −0.037 | 0.071 | B | B | B | −0.038 | 0.071 |
| 27 | 27 | −0.037 | 0.070 | B | B | B | −0.037 | 0.070 |
| 28 | 28 | −0.038 | 0.071 | B | B | B | −0.039 | 0.071 |
| 29 | 29 | −0.026 | 0.073 | B | B | B | −0.027 | 0.073 |
| 30 | 30 | −0.023 | 0.077 | B | A | B | −0.024 | 0.078 |
| 31 | 31 | −0.024 | 0.079 | B | A | B | −0.025 | 0.080 |
| 32 | 32 | −0.028 | 0.072 | B | B | B | −0.028 | 0.073 |
| 33 | 33 | −0.036 | 0.072 | B | B | B | −0.036 | 0.073 |
| 34 | 34 | −0.026 | 0.073 | B | B | B | −0.027 | 0.073 |
| 35 | 35 | −0.027 | 0.073 | B | B | B | −0.028 | 0.073 |
| 36 | 36 | −0.025 | 0.072 | B | A | B | −0.026 | 0.072 |
| 37 | 37 | −0.025 | 0.072 | B | A | B | −0.026 | 0.072 |
| 38 | 38 | −0.024 | 0.072 | A | A | B | −0.025 | 0.072 |
| 39 | 39 | −0.039 | 0.068 | B | B | B | −0.040 | 0.068 |
| 40 | 40 | −0.038 | 0.069 | B | B | B | −0.040 | 0.069 |
| 41 | 41 | −0.029 | 0.074 | B | B | B | −0.030 | 0.074 |
| 42 | 42 | −0.029 | 0.074 | B | B | B | −0.029 | 0.074 |
| 43 | 43 | −0.027 | 0.076 | B | B | B | −0.028 | 0.077 |
| 44 | 44 | −0.028 | 0.075 | B | B | B | −0.029 | 0.075 |
| 45 | 45 | −0.038 | 0.069 | B | B | B | −0.039 | 0.069 |
| 46 | 46 | −0.039 | 0.068 | B | B | B | −0.040 | 0.068 |
| 47 | 47 | −0.029 | 0.072 | B | B | B | −0.030 | 0.072 |
| 48 | 48 | −0.029 | 0.072 | B | B | B | −0.029 | 0.072 |
| 49 | 49 | −0.028 | 0.072 | B | B | B | −0.029 | 0.073 |
| 50 | 50 | −0.037 | 0.071 | B | B | B | −0.038 | 0.071 |

| | 400 mm/s | | | 500 mm/s | | | | |
|---|---|---|---|---|---|---|---|---|
| | | | | Digital gradation characteristic | | | | |
| Example No. | 6 pt outline character | 3 pt character | Isolated one dot | High light gradation characteristic | Shadow gradation characteristic | 6 pt outline character | 3 pt character | Isolated one dot |
| 1 | B | A | B | −0.026 | 0.078 | B | B | B |
| 2 | B | A | B | −0.025 | 0.077 | B | B | B |

TABLE 3-continued

| | | | | | | | | |
|---|---|---|---|---|---|---|---|---|
| 3 | B | A | A | −0.024 | 0.075 | B | B | B |
| 4 | B | A | A | −0.023 | 0.074 | A | B | A |
| 5 | B | A | A | −0.023 | 0.074 | A | A | A |
| 6 | B | A | A | −0.023 | 0.074 | A | B | A |
| 7 | B | A | A | −0.023 | 0.074 | A | A | A |
| 8 | B | A | A | −0.023 | 0.075 | A | A | A |
| 9 | B | A | A | −0.023 | 0.073 | A | B | A |
| 10 | B | B | B | −0.027 | 0.081 | B | B | B |
| 11 | B | B | B | −0.027 | 0.079 | B | B | B |
| 12 | B | A | A | −0.023 | 0.073 | A | B | A |
| 13 | B | A | A | −0.023 | 0.073 | A | B | A |
| 14 | B | A | A | −0.023 | 0.075 | A | B | A |
| 15 | B | B | B | −0.028 | 0.075 | B | B | B |
| 16 | B | B | B | −0.028 | 0.075 | B | B | B |
| 17 | B | B | B | −0.028 | 0.074 | B | B | B |
| 18 | B | B | B | −0.028 | 0.072 | B | B | B |
| 19 | B | B | B | −0.028 | 0.076 | B | B | B |
| 20 | B | B | B | −0.028 | 0.073 | B | B | B |
| 21 | B | B | B | −0.037 | 0.075 | B | B | B |
| 22 | B | B | B | −0.037 | 0.074 | B | B | B |
| 23 | B | B | B | −0.037 | 0.073 | B | B | B |
| 24 | B | B | B | −0.028 | 0.075 | B | B | B |
| 25 | B | B | B | −0.038 | 0.072 | B | B | B |
| 26 | B | B | B | −0.039 | 0.071 | B | B | B |
| 27 | B | B | B | −0.038 | 0.071 | B | B | B |
| 28 | B | B | B | −0.040 | 0.071 | B | B | B |
| 29 | B | B | B | −0.027 | 0.074 | B | B | B |
| 30 | B | A | B | −0.024 | 0.078 | B | B | B |
| 31 | B | B | B | −0.025 | 0.080 | B | B | B |
| 32 | B | B | B | −0.029 | 0.073 | B | B | B |
| 33 | B | B | B | −0.037 | 0.073 | B | B | B |
| 34 | B | B | B | −0.028 | 0.074 | B | B | B |
| 35 | B | B | B | −0.029 | 0.073 | B | B | B |
| 36 | B | B | B | −0.027 | 0.073 | B | B | B |
| 37 | B | B | B | −0.026 | 0.073 | B | B | B |
| 38 | A | A | B | −0.025 | 0.073 | A | B | B |
| 39 | A | C | C | −0.042 | 0.067 | A | C | C |
| 40 | B | B | B | −0.041 | 0.068 | A | C | C |
| 41 | B | B | B | −0.031 | 0.074 | B | B | B |
| 42 | B | B | B | −0.030 | 0.074 | B | B | B |
| 43 | B | B | B | −0.029 | 0.077 | B | B | B |
| 44 | B | B | B | −0.030 | 0.075 | B | B | B |
| 45 | B | B | B | −0.040 | 0.069 | A | C | C |
| 46 | B | B | C | −0.041 | 0.068 | A | C | C |
| 47 | B | B | B | −0.030 | 0.072 | B | B | B |
| 48 | B | B | B | −0.030 | 0.073 | B | B | B |
| 49 | B | B | B | −0.029 | 0.073 | B | B | B |
| 50 | B | B | B | −0.039 | 0.071 | B | B | B |

TABLE 4

| Compara- | Photosensitive | 300 mm/s | | | | | 400 mm/s | |
|---|---|---|---|---|---|---|---|---|
| | | Digital gradation characteristic | | | | | Digital gradation characteristic | |
| tive Example No. | member manufacturing example No. | High light gradation characteristic | Shadow gradation characteristic | 6 pt outline character | 3 pt character | Isolated one dot | High light gradation characteristic | Shadow gradation characteristic |
| 1 | 51 | −0.038 | 0.084 | B | B | B | −0.043 | 0.092 |
| 2 | 52 | −0.029 | 0.080 | B | B | C | −0.033 | 0.087 |
| 3 | 53 | −0.040 | 0.079 | B | B | C | −0.044 | 0.085 |
| 4 | 54 | −0.040 | 0.079 | B | B | C | −0.043 | 0.084 |
| 5 | 55 | −0.044 | 0.072 | A | C | C | −0.048 | 0.076 |
| 6 | 56 | −0.043 | 0.076 | A | C | C | −0.046 | 0.080 |
| 7 | 57 | −0.028 | 0.083 | B | B | B | −0.030 | 0.084 |
| 8 | 58 | −0.041 | 0.080 | B | B | C | −0.043 | 0.084 |
| 9 | 59 | −0.043 | 0.076 | A | C | C | −0.046 | 0.080 |
| 10 | 60 | −0.042 | 0.080 | B | B | C | −0.044 | 0.083 |
| 11 | 61 | −0.043 | 0.076 | A | C | C | −0.047 | 0.079 |
| 12 | 62 | −0.040 | 0.078 | B | B | C | −0.043 | 0.081 |
| 13 | 63 | −0.040 | 0.079 | B | B | C | −0.042 | 0.083 |
| 14 | 64 | −0.040 | 0.079 | B | B | C | −0.042 | 0.082 |
| 15 | 65 | −0.041 | 0.077 | B | B | C | −0.043 | 0.079 |
| 16 | 66 | −0.042 | 0.078 | B | B | C | −0.044 | 0.081 |
| 17 | 67 | −0.042 | 0.077 | B | B | C | −0.044 | 0.080 |

TABLE 4-continued

| | | | | | | | | |
|---|---|---|---|---|---|---|---|---|
| 18 | 68 | −0.042 | 0.077 | B | B | C | −0.044 | 0.080 |
| 19 | 69 | −0.042 | 0.076 | B | B | C | −0.045 | 0.079 |
| 20 | 70 | −0.043 | 0.076 | A | C | C | −0.045 | 0.078 |
| 21 | 71 | −0.043 | 0.078 | B | B | C | −0.046 | 0.083 |
| 22 | 72 | −0.043 | 0.077 | A | C | C | −0.046 | 0.080 |
| 23 | 73 | −0.044 | 0.077 | A | C | C | −0.047 | 0.081 |
| 24 | 74 | −0.043 | 0.077 | A | C | C | −0.046 | 0.080 |
| 25 | 75 | −0.044 | 0.077 | A | C | C | −0.046 | 0.080 |
| 26 | 76 | −0.042 | 0.075 | B | B | C | −0.045 | 0.078 |
| 27 | 77 | −0.026 | 0.083 | B | B | B | −0.029 | 0.087 |
| 28 | 78 | −0.028 | 0.074 | B | B | C | −0.033 | 0.082 |
| 29 | 79 | −0.049 | 0.065 | X | C | D | −0.054 | 0.068 |
| 30 | 80 | −0.042 | 0.078 | B | B | C | −0.046 | 0.083 |
| 31 | 81 | −0.030 | 0.077 | A | C | C | −0.040 | 0.091 |
| 32 | 82 | −0.042 | 0.076 | B | B | C | −0.043 | 0.078 |
| 33 | 83 | −0.041 | 0.076 | B | B | C | −0.043 | 0.078 |

| Comparative Example No. | 400 mm/s | | | 500 mm/s | | | | |
|---|---|---|---|---|---|---|---|---|
| | | | | Digital gradation characteristic | | | | |
| | 6 pt outline character | 3 pt character | Isolated one dot | High light gradation characteristic | Shadow gradation characteristic | 6 pt outline character | 3 pt character | Isolated one dot |
| 1 | B | B | C | −0.057 | 0.118 | A | C | C |
| 2 | B | B | C | −0.042 | 0.107 | X | C | D |
| 3 | B | B | C | −0.055 | 0.103 | X | C | D |
| 4 | B | B | C | −0.054 | 0.101 | X | C | D |
| 5 | X | C | D | −0.058 | 0.088 | X | C | D |
| 6 | X | C | D | −0.055 | 0.093 | X | C | D |
| 7 | B | B | C | −0.035 | 0.097 | B | B | C |
| 8 | B | B | C | −0.052 | 0.098 | A | C | D |
| 9 | X | C | D | −0.056 | 0.093 | X | C | D |
| 10 | A | C | D | −0.053 | 0.096 | X | C | D |
| 11 | X | C | D | −0.056 | 0.092 | X | C | D |
| 12 | B | B | C | −0.050 | 0.094 | A | C | D |
| 13 | B | B | C | −0.049 | 0.095 | B | B | C |
| 14 | B | B | C | −0.050 | 0.095 | A | C | C |
| 15 | B | B | C | −0.050 | 0.090 | A | C | D |
| 16 | A | C | C | −0.053 | 0.095 | X | C | D |
| 17 | A | C | C | −0.052 | 0.091 | X | C | D |
| 18 | A | C | C | −0.052 | 0.091 | X | C | D |
| 19 | A | C | D | −0.052 | 0.090 | X | C | D |
| 20 | A | C | D | −0.052 | 0.088 | X | C | D |
| 21 | X | C | C | −0.057 | 0.098 | X | C | D |
| 22 | X | C | D | −0.056 | 0.093 | X | C | D |
| 23 | X | C | D | −0.056 | 0.093 | X | C | D |
| 24 | X | C | D | −0.054 | 0.092 | X | C | D |
| 25 | X | C | D | −0.055 | 0.091 | X | C | D |
| 26 | B | B | C | −0.051 | 0.088 | A | C | D |
| 27 | B | B | C | −0.038 | 0.108 | B | B | C |
| 28 | X | C | D | −0.045 | 0.105 | X | C | D |
| 29 | X | C | D | −0.063 | 0.077 | X | C | D |
| 30 | X | C | C | −0.056 | 0.098 | X | C | A |
| 31 | X | C | D | −0.076 | 0.131 | X | C | D |
| 32 | B | B | C | −0.048 | 0.087 | B | B | C |
| 33 | B | B | C | −0.048 | 0.087 | B | B | C |

In recent years, a spot diameter of a laser cannot be reduced due to demands for size reduction and cost reduction of an electrophotographic apparatus and there is also a demand for achieving both of the digital gradation characteristic and the analog gradation characteristic in good balance. In such a situation, the present invention can provide an electrophotographic photosensitive member in which character quality and the digital gradation characteristic in a low-line-number halftone are improved while the analog gradation characteristic is maintained also in a high speed process for achieving high productivity, as wells as a process cartridge and an electrophotographic apparatus that use the electrophotographic photosensitive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-130207, filed Aug. 6, 2021, which is hereby incorporated by reference herein in its entirety.

What is claimed is:

1. An electrophotographic photosensitive member, comprising:

a support;

an undercoat layer on the support, the undercoat layer containing a titanium oxide particle whose surface is subjected to a silane treatment and whose crystal structure is a rutile type or an anatase type;

a charge generation layer on the undercoat layer, the charge generation layer containing a titanyl phthalocyanine pigment having a strong peak at a Bragg angle 2θ of 27.2°=0.3° in CuKα characteristic X-ray diffraction;

a charge transfer layer on the charge generation layer; and the electrophotographic photosensitive member being an organic photosensitive member, wherein $I_{1/2}$<0.170 μJ/cm$^2$, AR<0.370, and $LR_i$≤780 V·cm$^2$/μJ are satisfied where in an $I_{exp}$-$V_{exp}$ graph that is obtained according to a measurement method of NESA-EV curve at temperature of 23.5° C. and relative humidity of 50% RH where charging potential Vd [V] is $V_d$=500 V and in which a horizontal axis represents an exposure light irradiation amount $I_{exp}$ [μJ/cm$^2$] and a vertical axis represents an absolute value $V_{exp}$ [V] of a surface potential after irradiation, $I_{1/2}$ [μJ/cm$^2$] is a light amount at $V_{exp}$=250 V, $S_{max}$ is a maximum value of a product S=$I_{exp}$·$V_{exp}$ [V·μJ/cm$^2$] in a range of $I_{exp}$=0.000 to 3.414.11/2 [μJ/cm$^2$], Q is an intersection between an approximate straight line in a range of $I_{exp}$=0.000 to 0.100.11/2 [μJ/cm$^2$] and an approximate straight line in a range of $I_{exp}$=(5.11/2-0.100) to 5.11/2 [μJ/cm$^2$], $I_i$ [μJ/cm$^2$] is a light amount value at the point Q, $V_i$ [V] is a potential value at the point Q, and $S_i$=$I_i$·$V_i$ [V·μJ/cm$^2$], AR=$S_i$/$S_{max}$, and $LR_i$=$V_i$/$I_i$ [V·cm$^2$/μJ], and the measurement method of NESA-EV curve is performed such that (1) the surface potential of the electrophotographic photosensitive member is set to 0 V, (2) the electrophotographic photosensitive member is charged for 0.005 seconds such that the absolute value of the surface potential of the electrophotographic photosensitive member becomes $V_0$ [V], (3) 0.02 seconds after start of the charging, the charged electrophotographic photosensitive member is exposed continuously for t seconds to light with a wavelength of 805 nm and an intensity of 25 mW/cm$^2$ such that an exposure amount becomes $I_{exp}$ [μJ/cm$^2$], (4) 0.06 seconds after the start of the charging, the absolute value of the surface potential of the exposed electrophotographic photosensitive member is measured and the measured value is represented by $V_{exp}$ [V], (5) operations of (1) to (4) are repeated while changing $I_{exp}$ from 0.000 μJ/cm$^2$ to 0.850 μJ/cm$^2$ at intervals of 0.001 μJ/cm$^2$ by changing t to obtain $V_{exp}$ corresponding to each value of $I_{exp}$, and (6) $V_{exp}$ [V] in the case where t=0 and $I_{exp}$=0.000 μJ/cm$^2$ are set in the operation of (3) is referred to as charging potential $V_d$ [V] and $V_0$ [V] in the case where the operation of (2) is performed is set such that the value of Vd becomes 500 V.

2. The electrophotographic photosensitive member according to claim 1, wherein AR≤0.370 and $LR_i$≤520 V·cm$^2$/μJ.

3. The electrophotographic photosensitive member according to claim 1, wherein AR≤0.100.

4. The electrophotographic photosensitive member according to claim 1, wherein $LR_i$≤60 V·cm$^2$/μJ.

5. The electrophotographic photosensitive member according to claim 1, wherein a value $V_r$ of $V_{exp}$ at $I_{exp}$=5.11/2 in the $I_{exp}$-$V_{exp}$ graph is $V_r$≤70 V.

6. The electrophotographic photosensitive member according to claim 5, wherein $V_r$≤10 V.

7. A process cartridge integrally supporting the electrophotographic photosensitive member according to claim 1; and at least one member selected from the group consisting of a charging unit, a development unit, and a cleaning unit, wherein the process cartridge is attachable to and detachable from a main body of an electrophotographic apparatus.

8. An electrophotographic apparatus, comprising:

the electrophotographic photosensitive member according to claim 1;

a charging unit;

an exposure unit;

a development unit; and a transfer unit.

9. An electrophotographic photosensitive member, comprising:

a support;

an undercoat layer on the support, the undercoat layer containing a titanium oxide particle whose surface is subjected to a silane treatment and whose crystal structure is a rutile type or an anatase type;

a charge generation layer on the undercoat layer, the charge generation layer containing a titanyl phthalocyanine pigment having a strong peak at a Bragg angle 2θ of 27.2°+0.3° in CuKα characteristic X-ray diffraction;

a charge transfer layer on the charge generation layer; and the electrophotographic photosensitive member being an organic photosensitive member, wherein 11/2≤0.170 μJ/cm$^2$, AR≤0.500, and $LR_i$≤520 V·cm$^2$/μJ are satisfied where in an $I_{exp}$-$V_{exp}$ graph that is obtained according to a measurement method of NESA-EV curve at temperature of 23.5° C. and relative humidity of 50% RH in a case where a charging potential $V_d$ [V] is $V_d$=500 V and in which a horizontal axis represents an exposure light irradiation amount $I_{exp}$ [μJ/cm$^2$] and a vertical axis represents an absolute value $V_{exp}$ [V] of a surface potential after irradiation, $I_{1/2}$ [μJ/cm$^2$] is a light amount at $V_{exp}$=250 V, $S_{max}$ is a maximum value of a product S=$I_{exp}$·$V_{exp}$ [V·μJ/cm$^2$] in a range of 0.000≤$I_{exp}$≤3.414·$I_{1/2}$, Q is an intersection between an approximate straight line in a range of 0.000≤$I_{exp}$≤0.100.11/2 and an approximate straight line in a range of 5.11/2-0.100<$I_{exp}$≤5.11/2 [μJ/cm$^2$], $l_i$ [μJ/cm$^2$] is a light amount value at the point Q, $V_i$ [V] is a potential value at the point Q, and $S_i$=$l_i$·$V_i$ [V·μJ/cm$^2$], AR=$S_i$/$S_{max}$, and $LR_i$=$V_i$/$l_i$ [V·cm$^2$/μJ], and the measurement method of NESA-EV curve is performed such that (1) the surface potential of the electrophotographic photosensitive member is set to 0 V, (2) the electrophotographic photosensitive member is charged for 0.005 seconds such that the absolute value of the surface potential of the electrophotographic photosensitive member becomes $V_0$ [V], (3) 0.02 seconds after start of the charging, the charged electrophotographic photosensitive member is exposed continuously for t seconds to light with a wavelength of 805 nm and an intensity of 25 mW/cm$^2$ such that an exposure amount becomes $I_{exp}$ [μJ/cm$^2$], (4) 0.06 seconds after the start of the charging, the absolute value of the surface potential of the exposed electrophotographic photosensitive member is measured and the measured value is represented by $V_{exp}$ [V], (5) operations of (1) to (4) are repeated while changing $I_{exp}$ from 0.000 μJ/cm$^2$ to 0.850 μJ/cm$^2$ at intervals of 0.001 μJ/cm$^2$ by changing t to obtain $V_{exp}$ corresponding to each value of $I_{exp}$, and (6) $V_{exp}$ [V] in the case where t=0 and $I_{exp}$=0.000 μJ/cm$^2$ are set in the operation of (3) is referred to as charging potential $V_d$ [V] and $V_0$ [V] in the case where the operation of (2) is performed is set such that the value of $V_d$ becomes 500 V.

10. The electrophotographic photosensitive member according to claim 9, wherein AR≤0.370 and $LR_i$≤520 V·cm$^2$/μJ.

11. The electrophotographic photosensitive member according to claim 9, wherein AR≤0.100.

12. The electrophotographic photosensitive member according to claim 9, wherein $LR_i$≤60 V·cm$^2$/μJ.

13. The electrophotographic photosensitive member according to claim 9, wherein a value $V_r$ of $V_{exp}$ at $I_{exp}$=5.11/2 in the $I_{exp}$-$V_{exp}$ graph is $V_r$≤70 V.

14. The electrophotographic photosensitive member according to claim 13, wherein $V_r$≤10 V.

15. A process cartridge integrally supporting the electrophotographic photosensitive member according to claim 9; and at least one member selected from the group consisting of a charging unit, a development unit, and a cleaning unit, wherein the process cartridge is attachable to and detachable from a main body of an electrophotographic apparatus.

16. An electrophotographic apparatus, comprising:

the electrophotographic photosensitive member according to claim 9;

a charging unit;

an exposure unit;

a development unit; and a transfer unit.

17. The electrophotographic photosensitive member according to claim 1, wherein the charge transfer layer comprises a charge transfer substance illustrated by formula (A5) and a charge transfer substance illustrated by formula (A6)

(A5)

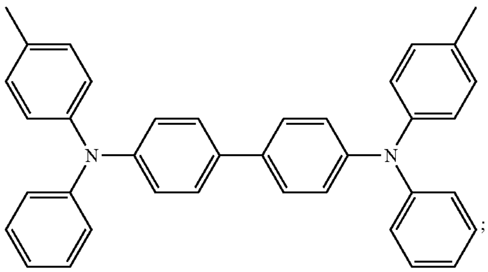

; and

-continued (A6)

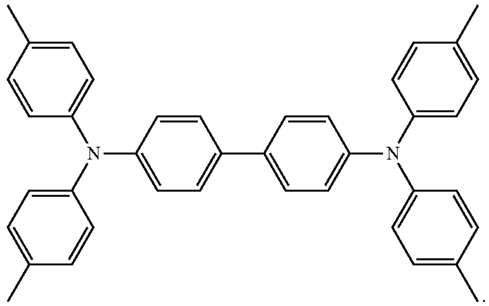

18. The electrophotographic photosensitive member according to claim 9, wherein the charge transfer layer comprises a charge transfer substance illustrated by formula (A5) and a charge transfer substance illustrated by formula (A6)

(A5)

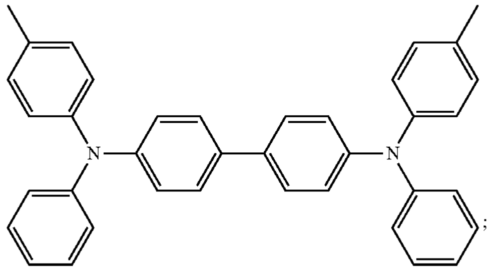

; and (A6)

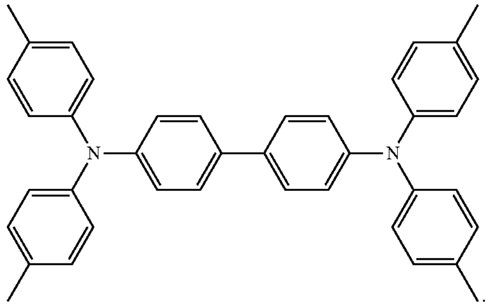

* * * * *